US006935959B2

(12) United States Patent
Danieli et al.

(10) Patent No.: US 6,935,959 B2
(45) Date of Patent: Aug. 30, 2005

(54) USE OF MULTIPLE PLAYER REAL-TIME VOICE COMMUNICATIONS ON A GAMING DEVICE

(75) Inventors: Damon V. Danieli, Clyde Hill, WA (US); Roxana Gabriela Arama, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 581 days.

(21) Appl. No.: 10/147,578

(22) Filed: May 16, 2002

(65) Prior Publication Data

US 2003/0216178 A1 Nov. 20, 2003

(51) Int. Cl.[7] .................................................. A63F 9/24
(52) U.S. Cl. .......................................... 463/42; 463/35
(58) Field of Search ................................. 704/200, 212, 704/270, 275, 500–501; 463/1, 30–42; 345/418, 473; 725/135, 141, 143, 153

(56) References Cited

U.S. PATENT DOCUMENTS

| | | | | |
|---|---|---|---|---|
| RE36,574 E | * | 2/2000 | Hochstein et al. | 463/42 |
| 6,067,095 A | | 5/2000 | Danieli | 345/473 |
| 6,183,367 B1 | * | 2/2001 | Kaji et al. | 463/42 |
| 6,599,194 B1 | * | 7/2003 | Smith et al. | 463/30 |

OTHER PUBLICATIONS

Mindmaker, Inc. "Game Commander 2: Experience The Most Powerful and Flexible Voice Solution for Games." n.d.: 5 pp. Available http://www.gamecommander.com/products/gc2.html.

Mindmaker, Inc. Game Commander vs. Game Voice. n.d.: 4 pp. Available http://www.gamecomander.com/products/gcvsgv.html.

TeamSound. "Battlefield Sequencing Gets Your Team Working Together!" n.d.: 2 pp. Available http://www.teamsound.com/command.html.

Game Spy Industries. "Roger Wilco." n.d.: 2 pp. Available http://www.rogerwilco.gamespy.com/products/rw/index.html.

TeamSound. "What is Command & Control?" n.d: 2 pp. Available http://www.teamsound.com/command.html.

Closs, Pete. Sharky Games. "Voice Control Software Roundup." Feb. 7, 2001. 2 pp. Available http://www.sharkygames.com/games/articles/voice_software/.

Closs, Pete. Sharky Games. Miscellaneous Game Articles. n.d.: 11 pp. Available http://www.sharkygames.com/games/articles/voice_software//2shtml, 3shtml, 4shtml, 5shtml, and 6shtml.

* cited by examiner

*Primary Examiner*—Mark Sager
(74) *Attorney, Agent, or Firm*—Ronald M. Anderson

(57) ABSTRACT

A game console capable of communicating with other game consoles over a link or network is provided with a headphone and microphone for each player who will engage in voice communication. Verbal communications directed to one or more other players are converted to pulse code modulated (PCM) digital data and are encoded and compressed in real-time, producing data packets that are transmitted to another game console. The compressed data packets are decompressed and decoded, producing PCM data that are converted to an analog signal that drives a headphone of the intended recipient. Players can selectively mute voice communications to and from a specific other player. The PCM data can be encoded in a round-robin fashion that reduces the number of encoders required. A predefined level of computing resources is used for voice communication to avoid aversely affecting the quality of game play.

43 Claims, 13 Drawing Sheets

USE OF MULTIPLE PLAYER REAL-TIME VOICE COMMUNICATIONS ON A GAMING DEVICE

FIELD OF THE INVENTION

The present invention generally relates to communication between players of an electronic game; and more specifically, pertains to a multiplayer electronic game system that facilitates voice communication between players using one or more multiplayer electronic gaming devices, including voice communication over a network that conveys data between the multiplayer electronic gaming devices that are coupled together to enable the player to participate in a game.

BACKGROUND OF THE INVENTION

When playing a non-electronic game with one or more other people, for example, a card game such as bridge, the social interaction arising through verbal communication between the players during the game typically adds much to the enjoyment of the game. Verbal communication is also often an element of game play, since comments made by a player to an opponent during a game can have the effect of causing the opponent to lose concentration and perform poorly, while comments made to team members can provide encouragement, thereby improving their quality of play. Verbal communication between persons playing games is thus clearly an important element of the gaming experience.

The verbal repartee between players that is so important to game play was initially missing when players first began to play electronic games over the Internet and other network links. Players at different sites were generally not able to communicate with each other, because their personal computers (PCs) only communicated data related to the play of a game over the network. The loss of the verbal communication and related social interaction that is such an important aspect of games played by people at the same location thus caused games played over the Internet to be less interesting. To address this problem, hardware and software solutions were developed that support voice communications between PCs over the Internet or other network during game play. At about the same time, techniques were developed to convey voice over the Internet or other networks (i.e., voice over IP) to enable communications between parties connected by the network without incurring the cost of conventional telephone long distance calls. This work resulted in the creation of various protocols supporting voice over IP communication, including the H.323 specification, Session Initiation Protocol (SIP), and Media Gateway Control Protocol/Media Gateway Controller (MGCP/MEGACO) specification. The techniques developed for voice over IP are generally applicable to and have been used in schemes to enable verbal communications between players of PC electronic games over a network. Examples of systems that provide voice communication between connected PCs during game play include Microsoft Corporation's SIDE WINDER GAME VOICE™, Mindmaker, Inc.'s GAME COMMANDER 2™ device and software, TEAM-SOUND™ software, GameSpy Industries' ROGER WILCO™ software, and Alienware Technology's FIRST CONTACT™ software. The voice communication provided by these products greatly adds to the enjoyment of playing games on PCs that are connected over the Internet or other networks. Some of these systems operate in peer-to-peer mode, in which voice data are transferred over the network directly between PCs, while others require a voice server that receives the voice data from one game player's PC and forwards the voice data over the network to one or more other PCs that are connected to the network for playing the game.

Since these systems provide communication for only one player per PC, each PC produces its own network stream of voice data, and this network stream is directed to other PC of each other player (or to the voice server, which then directs the voice data to the PC of each other player). This approach thus produces a substantial network data overhead.

Currently, none of the prior art systems for PC game voice communication enable multiple players per PC in a game played over the Internet or other network and therefore, the prior art does not support multiplayer-per-PC voice communication functionality. Also, if such multiplayer PC systems were developed using existing voice communication protocols for several players on a PC, they would likely require an excessive amount of computational resources. Allocating the required resources to voice communication for all players of the game on a PC might well have an adverse effect on the quality of game play, unless the PC had a very fast processor, lots of memory, and a fast video driver card.

In contrast to PCs, dedicated game consoles often do not have the processing power and available memory of a powerful PC, so this problem is of even greater concern in developing a scheme to support voice communications by multiple players on each game console. It would be desirable to allocate a fixed level to the requirements for memory and other computer resources needed for voice communication, independent of the number of players who are capable of voice communication on the game console, as appropriate for the game functionality and design, so that the resources required for voice processing are not allowed to increase beyond a defined limit as the number of players participating in voice communication changes. It would also be advantageous to enable voice communications between multiple players for each instance of a game at a site, and to enable each player to control with whom the player verbally communicates (both speaking and listening), and to combine all of the voice data from that instance of the game into a single network data stream in order to reduce the network bandwidth required for voice communications between multiplayer game consoles. It would further be desirable to share certain resources, such as a voice data encoder or decoder, between multiple players for a single game instance at a site.

As the quality of game graphics improves, it becomes more important to maintain other features relating to realism. One such feature is the ability to provide lip sync or other viseme (lip position) information with the voice data during game play, to enable the lips of a graphic character displayed in a game to move in synchronization with the words of a player who is represented by and controlling the graphic character in the game display. However, existing voice communication systems typically do not convey data to enable lip sync, and as a result, the player receiving the voice communication will not see the lips of the character in the game corresponding to the player who is speaking move in sync with the speaker's words.

While voice communication is generally a desirable feature, if misused by a specific player, it may become annoying and reduce the enjoyment of games by other players. The prior art also does not enable a player to block an annoying player from talking or listening to the player during any game in which an annoying player is a participant, regardless of the game console used by the annoying player. Different people have varying degrees of tolerance for annoying behavior of others. However, any player who chooses not to listen or speak to a specific other player for any reason, must have the ability to prevent communication with the specific other player, without giving up the ability to communicate with other players in games. A player may be upset because the player feels a specific other player uses excessive profanity or sexually explicit language, or uses language or makes comments that the player feels to be derogatory or socially unacceptable.

A parent may also want to block a child from participating in voice communication during game play to avoid exposing the child to any profanity and to preclude verbal communication with someone who might attempt to contact the child outside the scope of game play for harmful purposes. This parental block of a child's voice communication should be stored on an online game service so that it remains in effect if the child connects to the online game service from a different game console. The prior art game voice communication systems do not permit blocking verbal communications by a selected player, such as a child, participating in games using a multiplayer game console.

Should any player's verbal conduct while playing games over the Internet or other network become so egregious (based upon the number of complaints received from other players) as to warrant it, an online game service should be able to prevent that player from participating in voice communication while playing games through the online game service for a period of time, and if further justified by the continued receipt of complaints about that player's verbal behavior, to ban the player from using voice communication permanently. The current voice communication systems do not enable this level of control to be applied at each online game service so that a player is banned regardless of an alias used or the game console through which the player participates in game play through the online game service.

Although voice communications systems are well known for use on PCs playing games, gaming consoles have a different architecture, with a defined limit on available system resources. Most game consoles enable multiple players on a single instance of a game, i.e., on the same console. When gaming consoles are interconnected over the Internet or other network, they should preferably be able to provide voice communications for each of multiple players on the game console. Use of conventional techniques that have been developed to enable voice communication during game play on PCs will be unacceptable on game consoles, because of the more limited computing resources and the need to accommodate voice communications for multiple players. Accordingly, there is clearly a need for a method and system to enable voice communication for games played on one or more multiplayer game consoles, which addresses the issues noted above.

SUMMARY OF THE INVENTION

As noted above, voice communication between one person playing a game on a PC connected over a network and one or more other players of the game, each using a separate PC is well known. In contrast, the present invention enables more than one person playing a game on a game console to verbally communicate locally and/or over a network with one or more other people playing the game. To avoid creating too much of a demand for computing resources to support verbal communication as more people join in the game, the present invention enables a designer of the game to establish a predefined limit on the computing resources that will be employed to support verbal communication between players of the game.

Specific hardware is provided for use with each multiplayer game console to support verbal communication between players of a game. Each player who is verbally communicating is provided with a headset that includes a microphone (more generally, an audio sensor) and a headphone (more generally, an audio transducer). The headset is coupled to a voice communication module, which is either attached to a game controller in one embodiment, or integrally included in a game controller in another embodiment. An input signal from the microphone is compressed and digitized by an encoder in the multiplayer game console. The digitized and compressed signal is then conveyed through a voice communication channel to another player who is an intended recipient. A decoder decompresses the compressed signal to produce an output signal that is applied to the headphone of the other player, to produce an audible sound corresponding to the sound originally produced and incident on the microphone of the player from whom the voice communication was conveyed. As used herein and in the claims that follow the term "voice communication" is intended to be synonymous and interchangeable with the term "verbal communication." Also, it will be understood that "verbal communication" or "voice communication" are intended to encompass the conveyance of spoken words and phrases, as well as other sounds or utterances such as grunts, screams, etc. that are produced by a player participating in a game.

A level of computing resources allocated to processing verbal communications on the multiplayer game console is preferably predefined and fixed so that it is independent of the number of players using voice communication while playing the game. This feature ensures that an increase in the number of players who are verbally communicating during a game does not adversely impact upon the quality of other aspects of the game play.

Data comprising the digital compressed signal are in a specific format when conveyed to one or more intended recipients playing the game on one or more game consoles. The digital compressed signal is conveyed over either a direct link or through a network, such as the Internet. Depending upon the game, each player can be enabled to select an intended recipient of a verbal communication from among the other players of the game. For example, members of a team can verbally communicate with each other and with a team leader over one voice channel, but the team leader may be able to selectively communicate with the team members over that same voice channel or with another team leader over a different voice channel.

Preferably, the step of encoding includes the step of converting the input signal from an analog signal to a digital signal, and compressing the digital signal to produce a compressed digital signal in the appropriate format. Similarly, the step of decoding preferably includes the steps of decompressing the compressed signal to produce a decompressed digital signal, and converting the decompressed digital signal to the output signal used to drive the audio transducer.

The format used for the compressed signal comprises a plurality of audio data packets. Each audio data packet extends over an audio time frame. Preferably, a predefined number of encoding instances are operative on the game console during each audio time frame. The predefined number is preferably less than a total number of players using the game console and producing verbal utterances to verbally communicate with other players. The verbal utterances of players on the game console are encoded in such a manner that if more players on the game console than the predefined number of encoding instances are speaking in successive audio time frames, a round robin selection is applied in choosing the verbal utterances that are encoded in successive audio time frames. The game being played determines the predefined number of encoding instances active at one time.

Parallel decoding of encoded data streams received from other multiplayer game consoles can be employed in conjunction with one or more mixers to produce the output signal that drives the players' headphones.

Selected players can be assigned to one or more channels, and players who are assigned to a common channel are enabled to selectively verbally communicate with each other. In one embodiment, each player is assigned to one or more listener channels on which the player can receive a verbal communication from other players. In addition, each player is assigned to one or more talker channels over which a verbal utterance is conveyed to other players. The verbal utterances heard by a specific player on the multiplayer game console are determined by logically combining (i.e., ANDing) the listener channel of the specific player with the talker channel of the player making the verbal utterance.

The method also includes the step of providing oral synchronization data for controlling an oral portion (e.g., the mouth) of an animated graphic character in the game. The oral synchronization data are used to control the oral portion of the animated graphic character that is displayed during the game, so that it moves in synchronization with the verbal utterance of the player who controls the animated graphic character.

A player is enabled to prevent verbal communication with a selected other player. Verbal communication with the selected player can be prevented in just a current game being played, or can be prevented in any game in which both the player and the selected other player are participating.

A further aspect of the present invention is directed to a system that enables verbal communication between players who are playing a game. The system includes a multiplayer game console having a processor and a memory. In the memory are stored machine instructions for causing the processor to carry out a plurality of functions, including executing an instance of a game. Verbal communication input and output devices are included for each player who will be verbally communicating during a game, and each verbal communication input and output device has a sound sensor that produces an input signal indicative of sound incident on the sound sensor, and a sound transducer that produces an audible sound in response to an output signal that is applied to the sound transducer. The machine instructions in the memory cause the processor to carry out functions generally consistent with the steps of the method described above to enable verbal communication.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Gaming System for Practicing the Present Invention

Figure 1:
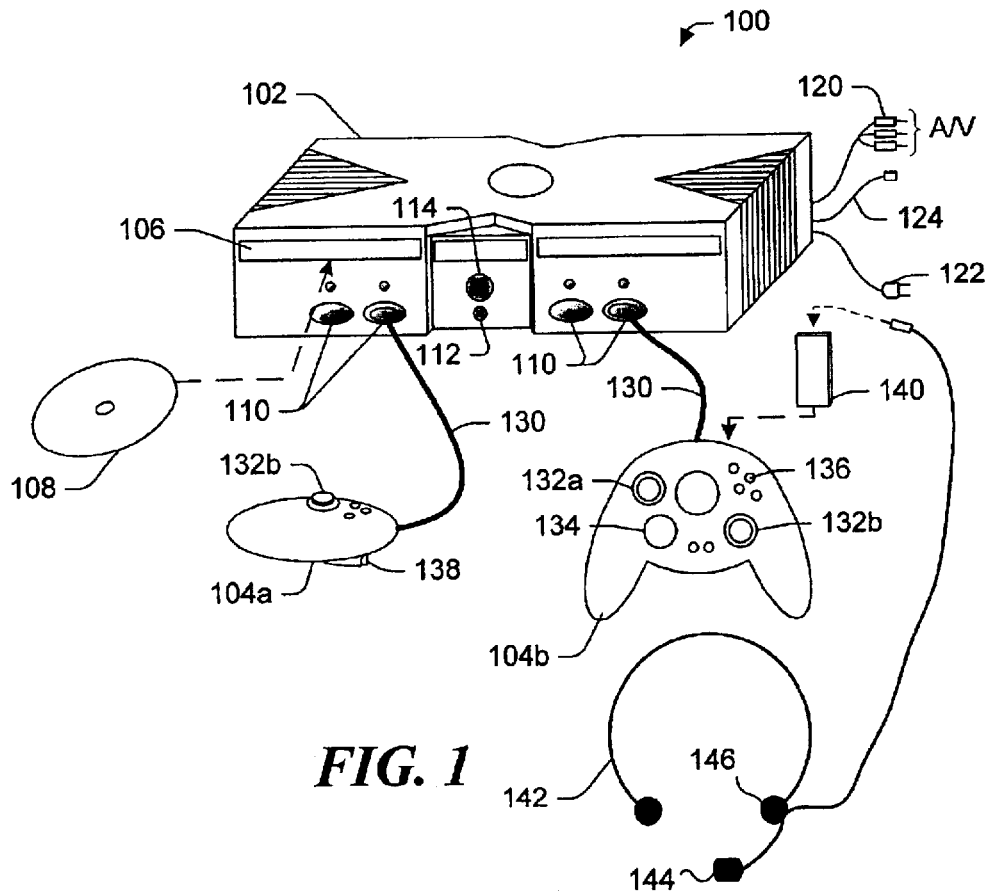
FIG. 1 is a schematic isometric view of a multiplayer game console and voice communication system in accord with the present invention.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and compact disk-read only memory (CD-ROM) discs. In this gaming system, game programs are preferably distributed for use with the game console on DVD discs, but it is also contemplated that other storage media might instead be used, or that games and other programs can be downloaded over the Internet or other network.

On a front face of game console 102 are four connectors 110 that are provided for electrically connecting to the controllers. It is contemplated that other types of connectors or wireless connections might alternatively be employed. A power button 112 and a disc tray eject button 114 are also positioned on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or the Internet, or through a broadband connection. Alternatively, it is contemplated that a modem (not shown) may be employed to transfer data to a network and/or the Internet. As yet a further alternative, the game console can be directly linked to another game console via an Ethernet cross-over cable (not shown).

Each controller 104*a* and 104*b* is coupled to game console 102 via a lead (or in another contemplated embodiment, alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 1, each controller 104*a* and 104*b* is equipped with two thumb sticks 132*a* and 132*b,* a D-pad 134, buttons 136, and two triggers 138. These controllers are merely representative, and other gaming input and control mechanisms may be substituted for or used in addition to those shown in FIG. 1, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and an headphone 146 or other type of audio transducer for producing audible sound in response to an output signal from the game console. In another embodiment that is being contemplated (not shown), the voice communicator capability is included as an integral part of a controller (not shown) that is generally like controllers 104*a* and 104*b* in other respects. The controllers illustrated in FIG. 1 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disc 108 in drive 106, or from an online source, or from a function unit or module.

Functional Components for Practicing the Present Invention

Figure 2:
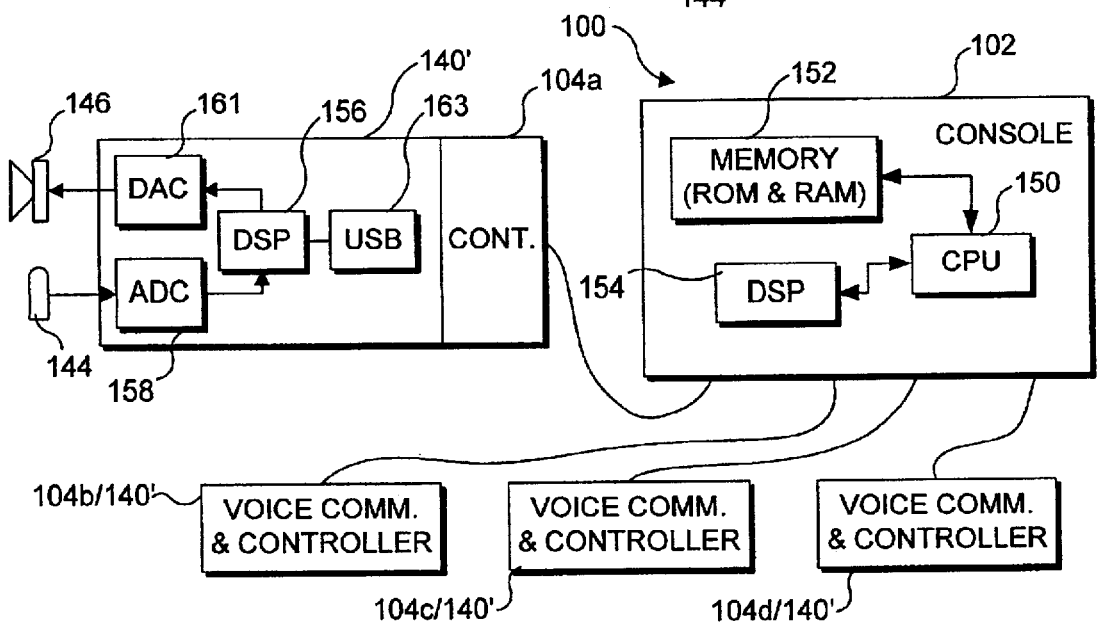
FIG. 2 is a block diagram of the multiplayer game console and voice communication module of FIG. 1.

Turning now to FIG. 2, a functional block diagram illustrates, in an exemplary manner, how components are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104*a*. It will be understood that controllers 104*b,* 104*c,* and 104*d* (if coupled to game console 100) can optionally each include a corresponding voice communication module 140' like that coupled to controller 104*a*. In a current preferred embodiment, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal into a corresponding digital signal. The digital signal from ADC 158 is input to DSP 156 for further processing, and the output of the DSP is applied to USB interface 163 for connection into controller 104*a*. In this embodiment, voice communication module 140' connects into the functional unit or module port on controller 104*a* through a USB connection (not separately shown). Similarly, digital sound data coming from game console 100 are conveyed through controller 104*a* and applied to USB interface 163, which conveys the digital signal to DSP 156 and onto DAC 161. DAC 161 converts the digital signal into a corresponding analog signal that is used to drive headphone 146.

With reference to multiplayer game console 100, several key functional components are shown, although it should be understood that other functional components relevant to the present invention are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104*a* to CPU 150, which handles encoding of the voice stream signal for transmission to other local voice communication modules and to other game consoles over a broadband connection through an Ethernet port (not shown in FIG. 2) on the game console.

An alternative embodiment employs DSP 156 in voice communication module 140' to encode the digital signal produced by ADC 158 in response to the analog signal from microphone 144. The encoded data are then conveyed through controller 104*a* to CPU 150, which again handles transmission of the encoded data to other local voice communication modules and other game consoles over the broadband connection on the game console.

It should be noted that multiplayer game console 100 can be either directly connected to another game console using a crossover Ethernet cable as a link, or can be connected to one or more other multiplayer game consoles through a more conventional network using a hub, switch, or other similar device, and/or can be connected to the Internet or other network through an appropriate cable modem, digital subscriber line (DSL) connection, or other appropriate interface broadband connection. An alternative embodiment is also contemplated in which multiplayer game console 100 is connected to the Internet or other network through a modem (not shown). Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163.

An alternative embodiment employs the CPU to convey the encoded data packets to intended voice communication module 140' through controller 104*a*. The encoded data packets are then decoded by DSP 156 in voice communication module 140', and the resulting decoded signal is conveyed to DAC 161, which creates a corresponding analog signal to drive headphone 146.

In still another contemplated alternative, the headphone and microphone for each player can be coupled directly to the game console and the functions of the voice communication module can be carried out by the CPU or other processor such as a DSP, and appropriate DAC and ADC modules in the game console. The location of the components that process sound signals to produce sound data conveyed between players and to produce the analog signals that drive the headphone of each player is thus not critical to the present invention.

CPU 150 also applies voice effects to alter the characteristics of the sound of a player speaking into microphone 144 and is able to change the character of the sound with a selection of different effects. For example, a female player can choose a voice effect to cause her voice to sound like the deep-tone voice of a male, or so that the voice has an elfin quality, or so that it has one of several other desired different tonal and pitch characteristics. Available voice effects from which a player can choose are game dependent. Such voice effects can substantially alter the sound of the player's voice so that the player is virtually unrecognizable, and can add drama or greater realism to a character in a game being controlled by a player, when the character appears to speak to other characters in the game. The voice effects thus facilitate role playing and mask the player's true identity. Even when players connected to the same game console 100 are directly audible to each other because they are only a few feet apart in the room in which the game console is disposed, the change in a player's voice due to voice effects being applied so alters the sound heard by other players receiving the verbal communication through their headphones that the local sound of a player's voice propagating within the room to the players can easily be ignored.

While not actually a limitation in the present invention, a current preferred embodiment of the game console 100 is designed with the expectation that a maximum of up to 16 players can engage in verbal communication during a game being played over a network or over the Internet through an online game service. Clearly, there is a practical limit to the number of verbal communications from other players with which a player might expect to engage at one time. Accordingly, it was assumed that a player is unable to comprehend verbal communications from more than four other players speaking simultaneously.

Game Play Scenarios

There are different appropriate scenarios, depending upon the type of game and the number of players engaged in a given game that affect the requirements for encoding and decoding voice communication signals. For example, there are three primary scenarios that impact on the requirements for voice communication. The first scenario is referred to as "point-to-point" and includes one player on each of two interconnected game consoles, where each player is engaged in voice communication with the other player. In the second scenario, which is referred to as "multipoint," there is again only one player who is engaged in voice communication on each game console, but up to 16 game consoles are interconnected over a network for play of a game, in which up to 16 players are participating. The third scenario is referred to as "multiplayer on game console," since up to four players per game console and up to four game consoles can be interconnected over a network to enable up to 16 players to simultaneously play a game and verbally communicate. In regard to the last scenario, two or more players on a single game console can also use voice communication during a game although they are physically located within the same room, since the benefits of the voice changes produced by use of the voice effects option can enhance the enjoyment of the game and role playing by each player, as noted above. Further, the limits of the total number of game consoles/ player referenced above in each of the three scenarios can be thought of as soft limits, since there is no inherent hardware limitation precluding additional players or game consoles participating.

By designing games in accord with one or more of these three scenarios, it is possible for the software designer to set a maximum predefined limit on the computing resources that will be allocated to voice communication, to avoid voice communication from adversely impacting the quality of game play. Also, a specific game that is played on the multiplayer game console can have its own requirements so that it is appropriate for play by only a certain number of players. The nature of the game will then dictate limitations on the number of verbal communication channels required. For example, a game such as chess will normally be played using the point-to-point scenario, because chess typically involves only two players. The voice communication functionality enables the two players to talk to each other while playing a chess game. For this point-to-point scenario, each game console would need to instantiate only one encoder and one decoder, since more encoders and decoders are not required. During each voice frame update, the CPU on a game console will update any encoding and decoding as necessary. Using a predefined encode CPU usage limit of 1.5 percent and a decode CPU usage limit of 0.5 percent in the point-to-point scenario, the total requirement for CPU usage would be only about 2.0 percent.

Figure 4:
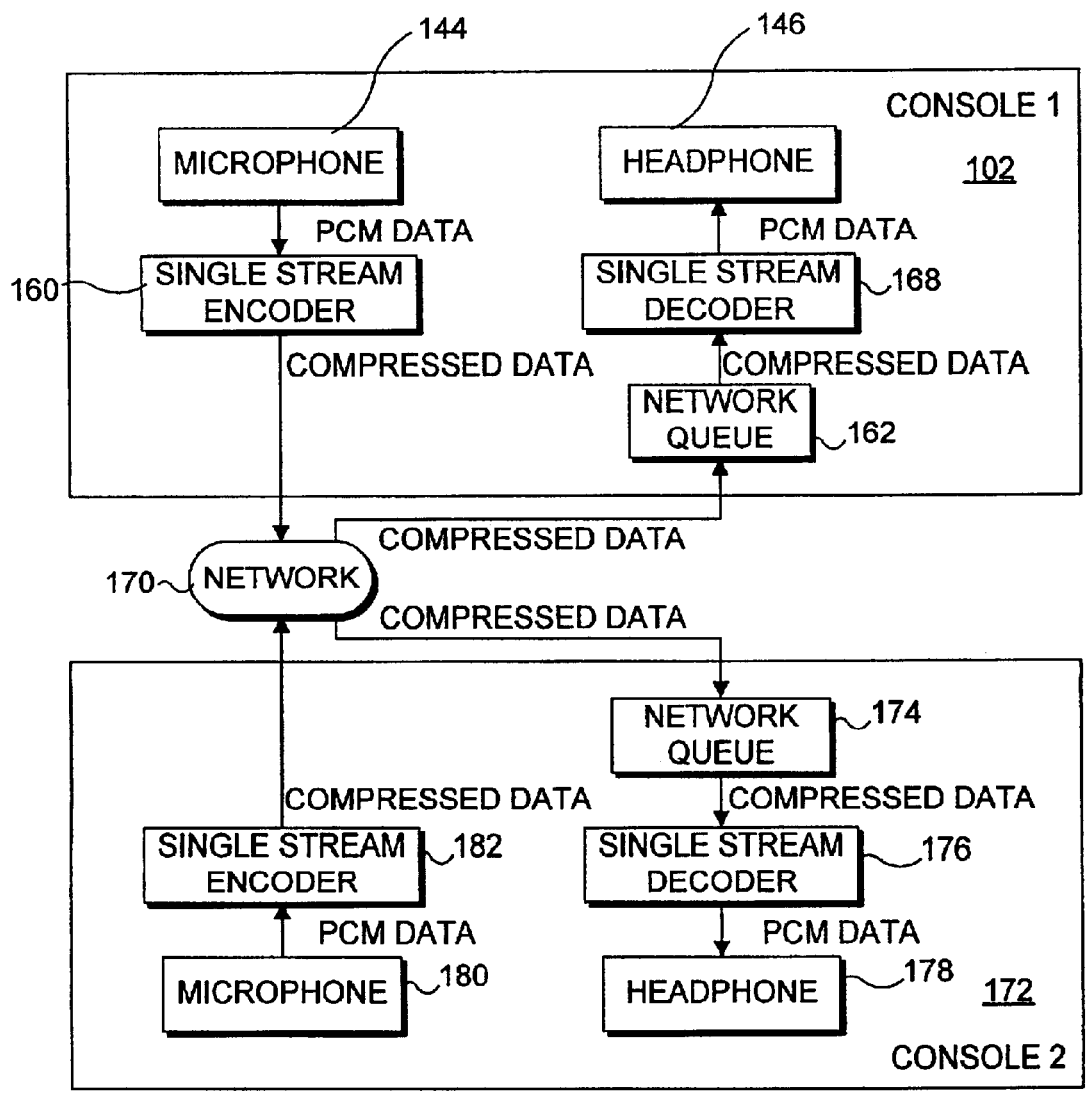
FIG. 4 is a functional block diagram illustrating two multiplayer game consoles coupled in point-to-point communication over a network.

As shown in the functional block diagram of FIG. 4, a game console 102 is coupled in voice communication with a game console 172. Microphone 144 responds to the voice of the player using console 102, and the voice communication module connected to the microphone produces pulse code modulated (PCM) data that are input to a single stream encoder 160. In response to the PCM data, the encoder produces compressed data packets that are then transmitted over a network 170 to which game console 172 is connected.

Alternatively, signal stream encoding can be carried out by the DSP of voice communication module. In this embodiment, microphone 144 responds to the voice of the player using game console 102, and DSP 156 is connected to ADC 158 and produces the compressed data packets that are then sent to game console 102 for transmission over network 170 to game console 172.

The compressed data from game console 102 are input to a network queue 174 in game console 102. The purpose of using a network queue to receive sound packet compressed data from console 102 is to remove jitter and other timing anomalies that occur when data are sent over network 170. The output of the single stream decoder is PCM data which are then applied to the DAC in the voice communication module of the player using game console 172 to produce an analog output that drives a headphone 178.

In an alternative embodiment, the compressed data are conveyed from game console 102 to DSP 156 in the voice communication module. The DSP decodes the compressed data, converting to a corresponding PCM signal, which is applied to DAC 161 in the voice communication module of the player using game console 172, to produce a corresponding analog output signal used to drive headphone 178.

Similarly, for verbal communications from the player using console 172, a microphone 180 converts the sound incident on it into PCM data using the ADC within the communication module to which microphone 180 is connected, and the PCM data are input to a single stream encoder 182, which produces compressed data that are conveyed through network 170 to a network queue 162 within game console 102. The compressed data from network queue 162 are input to a single stream decoder 168, which produces PCM data that are input to DAC converter in the voice communication module to which headphone 146 is connected. The DAC produces a corresponding analog sound signal. Thus, headphone 146 receives the analog sound signal corresponding to the sound of the player connected to console 172 (with any voice effects added).

In the multipoint scenario, where there is one player on each console, but multiple game consoles participating in a game session, the game designer can determine if all players should be able to verbally communicate with all of the other players playing the game, or if there will be teams comprising subsets of the players, so that only the players in on the same team may talk to each other. For example, if the game being played in multipoint scenario is a card game, there might be four individual players, one each per game console, or there might be two teams of two players each. If there are four separate players, each game console would instantiate one encoder and one four-to-one decoder (as discussed below). During a voice frame update, each console would update any encoding necessary for transmitting speech by the single player using the game console, and decoding of speech data from any of the (up to) three other players on the other game consoles participating in the game. For this scenario, using a predefined encode limit for CPU usage of 1.5 percent and a four-to-one decoder limit for CPU usage of about 1.3 percent, the total would be about 2.8 percent CPU usage on any of the four game consoles being used to play the card game.

Figure 3:
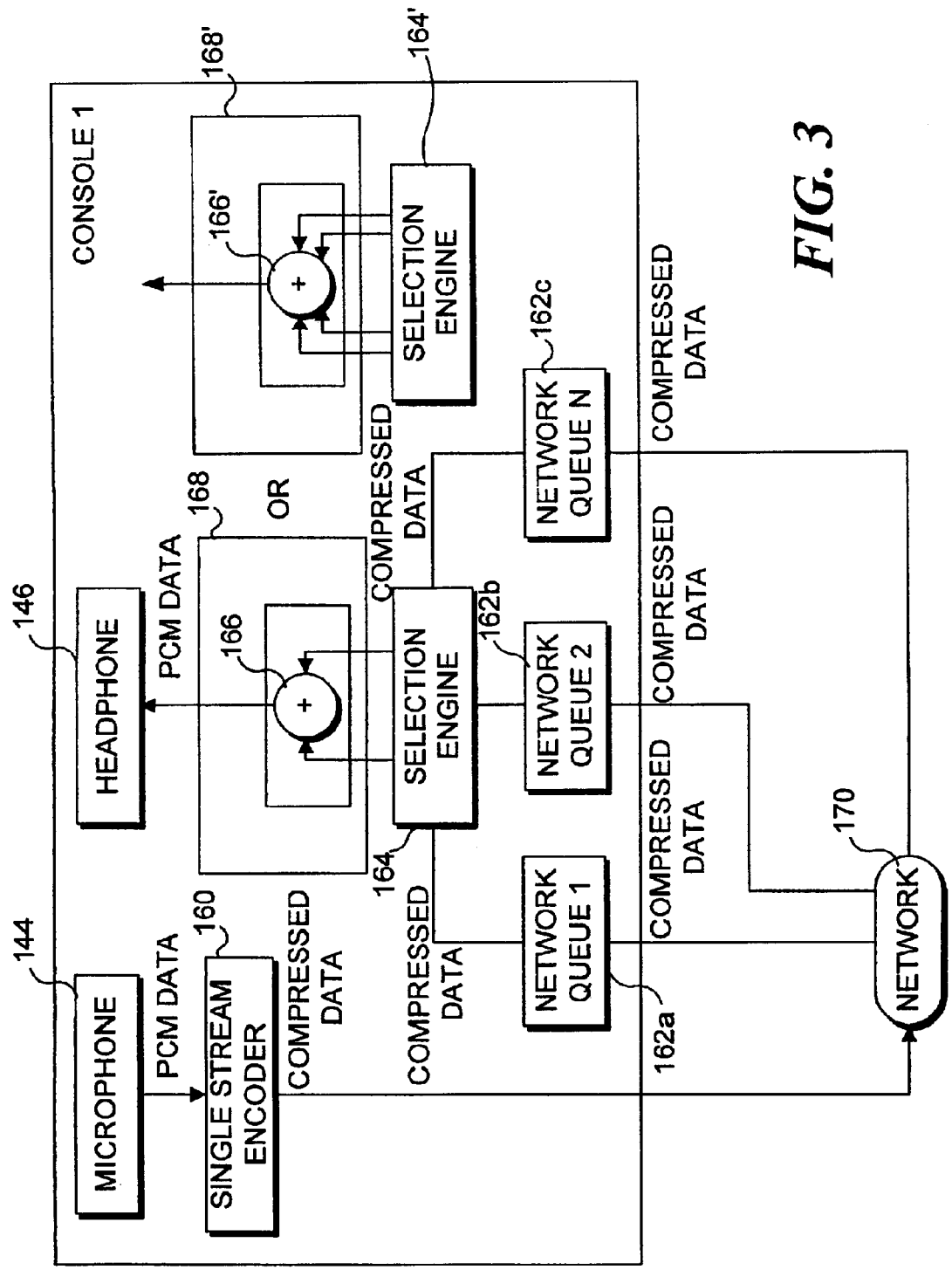
FIG. 3 is a functional block diagram of a multiplayer game console with voice communication capability.

FIG. 3 illustrates how the multipoint scenario is functionally implemented on each game console, but does not show the other game consoles. However, it will be understood that network 170 couples the other game consoles in communication with the illustrated game console. As noted above, the game console includes a single stream encoder 160, which receives the PCM data produced by the ADC in the voice communication module (not shown in FIG. 3) of the player. The PCM data are input into single stream encoder 160, producing voice frames of compressed data in packet form for transmission over network 170 to the other game consoles. Similarly, packets of compressed data are conveyed through network 170 from the other game consoles to the illustrated game console. Each player participating in the game (or channel) has a network queue on the game console in which the data packets are temporarily stored, to ensure that jitter and other timing problems are minimized when the packets of compressed data are selected by a selection engine 164 for mixing by a mixer 166 and decoding by decoder 168. Decoder 168 produces PCM data that are supplied to the DAC, which produces the analog signal that drives headphone 146.

In an alternative embodiment, selection engine 164 conveys the two selected compressed data streams to DSP 156 of the voice communication module (shown in FIG. 2) for mixing and decompression. DSP 156 produces a corresponding PCM signal that is supplied to the DAC in the voice communication module, which in turn, produces the corresponding analog signal that drives headphone 146.

As indicated in FIG. 3, network queues 162a, 162b, and 162c are respectively provided for each of the other players—up through N players.

In the multipoint scenario discussed above, there are only three network queues, since there are only three other players engaged in the card game. Since mixer 166 only combines two inputs at a time, decoder 168 only can provide simultaneous PCM data for two players at a time to the player wearing headphone 146. In contrast, an alternative is also shown in which a decoder 168' includes a mixer 166' that combines four data packets from a selection engine 164' at a time, to produce the output provided to headphone 146. In this alternative, the player is provided up to four other voice data packets simultaneously.

Alternatively, selection engine 164 can be employed to convey four selected compressed data streams to DSP 156 in the voice communication module of an intended recipient. DSP 156 again produces a corresponding PCM signal that is supplied to the DAC in the voice communication module, producing the corresponding analog signal to drive headphone 146.

Figure 5:
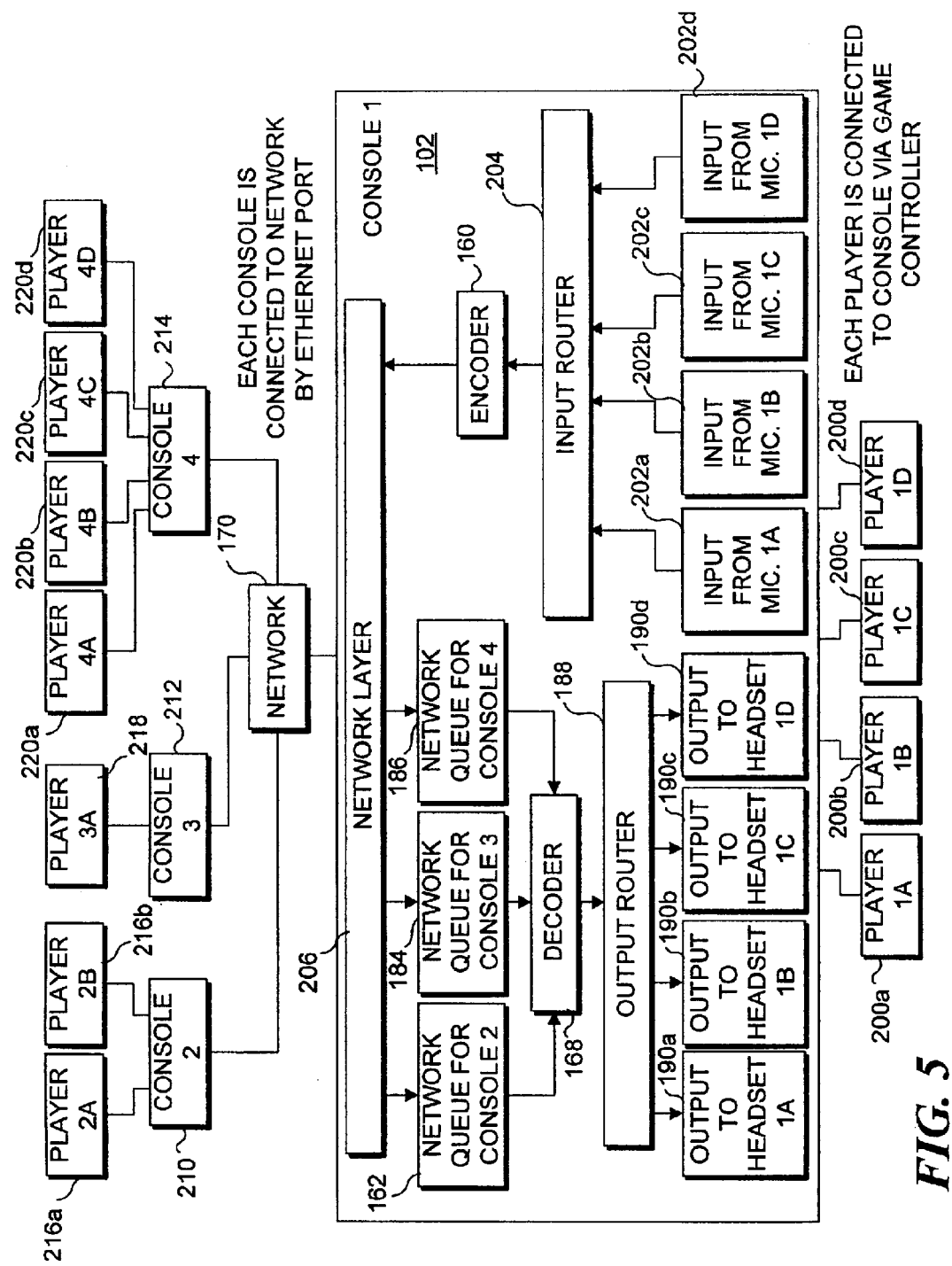
FIG. 5 is a block diagram illustrating a first multiplayer game console coupled in communication with three other multiplayer game consoles over a network.

Functional details for the "multiplayer on game console" scenario are illustrated in FIG. 5 where game console 102 is connected to network 170 through a network layer 206 and thus to a game console 210, having players 216a and 216b, to a game console 212 having a single player 218, and to a game console 214 having four players 220a, 220b, 220c, and 220d. Game console 102 has players 200a, 200b, 200c, and 200d connected thereto, and each player is provided with a game controller having a voice communication module. For this scenario, all of the players on each of consoles 210, 212, and 214 have voice communications that are encoded to produce single streams of compressed data packets. Network layer 206 in game console 102 conveys the data packets from each of the three other game consoles into three separate network queues, including a network queue 162 for second game console 210, a network queue 184 for third game console 212, and a network queue 186 for fourth game console 214. The output from the three network queues in game console 102 is input to decoder 168, and its output is applied to an output router 188 that determines the specific headphone that receives voice communications 190a through 190d.

An alternative embodiment employs output router 188 to bypass decoder 168 and pulls compressed data packets directly from network queues 162, 184, and 186. Output router 188 conveys the compressed data to the DSP in the voice communication module of the intended recipient, so that the headphone of that player receives voice communications 190a through 190d.

Accordingly, each of players 200a through 200d receives only the voice communications intended for that player. Similarly, each of the four players on game console 102 has a sound input from their corresponding microphones 202a, 202b, 202c, and 202d supplied to an input router 204, which selectively applies the PCM data streams to encoder 160, which has an output coupled to network layer 206. The network layer ensures that the compressed data packets conveying sound data are transported over network 170 to the appropriate one of game consoles 210, 212, and 214. The output router in each game console with multiple players determines the player(s) who will receive the voice communication from a player using game console 102.

Another embodiment bypasses input router 204 and encoder 160 by encoding the compressed data using the DSP in the voice communication module of the player who is speaking.

Prioritization/Round Robin Technique for Encoding

Figure 6:
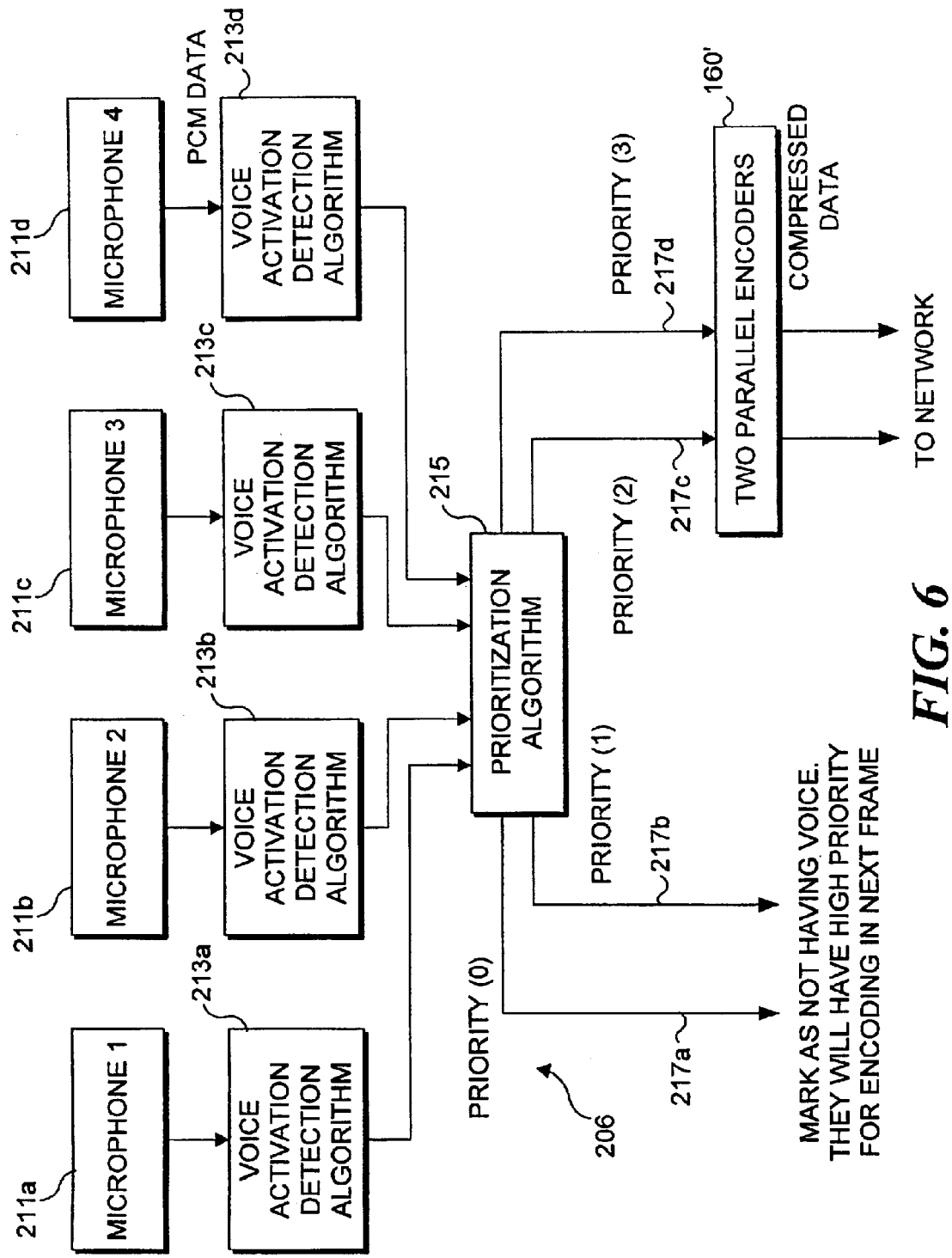
FIG. 6 is functional block diagram illustrating prioritization encoding for a plurality of players on a game console having two parallel encoders.

FIG. 6 illustrates functional aspects regarding prioritization on a game console handling voice communication by up to four players who are using the game console to play a game. During each voice interval, only two of four encoder instances are active, so that there are fewer encoders than there are players having voice communication capability, on the game console. Thus, although there are four microphone 211a, 211b, 211c, and 211d, the digital PCM data from the ADCs in the voice communication modules respectively connected to the microphones are not all encoded at the same time. Each stream of PCM data is applied to a voice activation detection algorithm, as indicated in blocks 213a, 213b, 213c, and 213d. This algorithm determines when a player is speaking into the microphone and producing PCM data that should be encoded for transmission to one or more other players in a game. In the worse case scenario, all four players might be speaking at the same time so that the voice activation detection algorithm would indicate that PCM data from all four microphones connected to the game console need to be encoded. However, since only two voice streams can be encoded at one time in this preferred embodiment, a prioritizing algorithm in a block 215 determines or selects the streams of PCM data that are input to the two parallel encoders 160'. These encoders produce compressed data in packetized frames that are conveyed over the network (assuming that the game console is connected to one or more other game consoles over a link or network). In the example shown in FIG. 6, the prioritizing algorithm has selected two streams of PCM data, including PCM data 217c and 217d, as having the highest priority for encoding in the current frame for output over the network. In contrast, PCM data in streams 217a and 217b are marked as not having a voice input, but will have the highest priority for encoding in the next frame of compressed data if they then include voice data.

Figure 12:
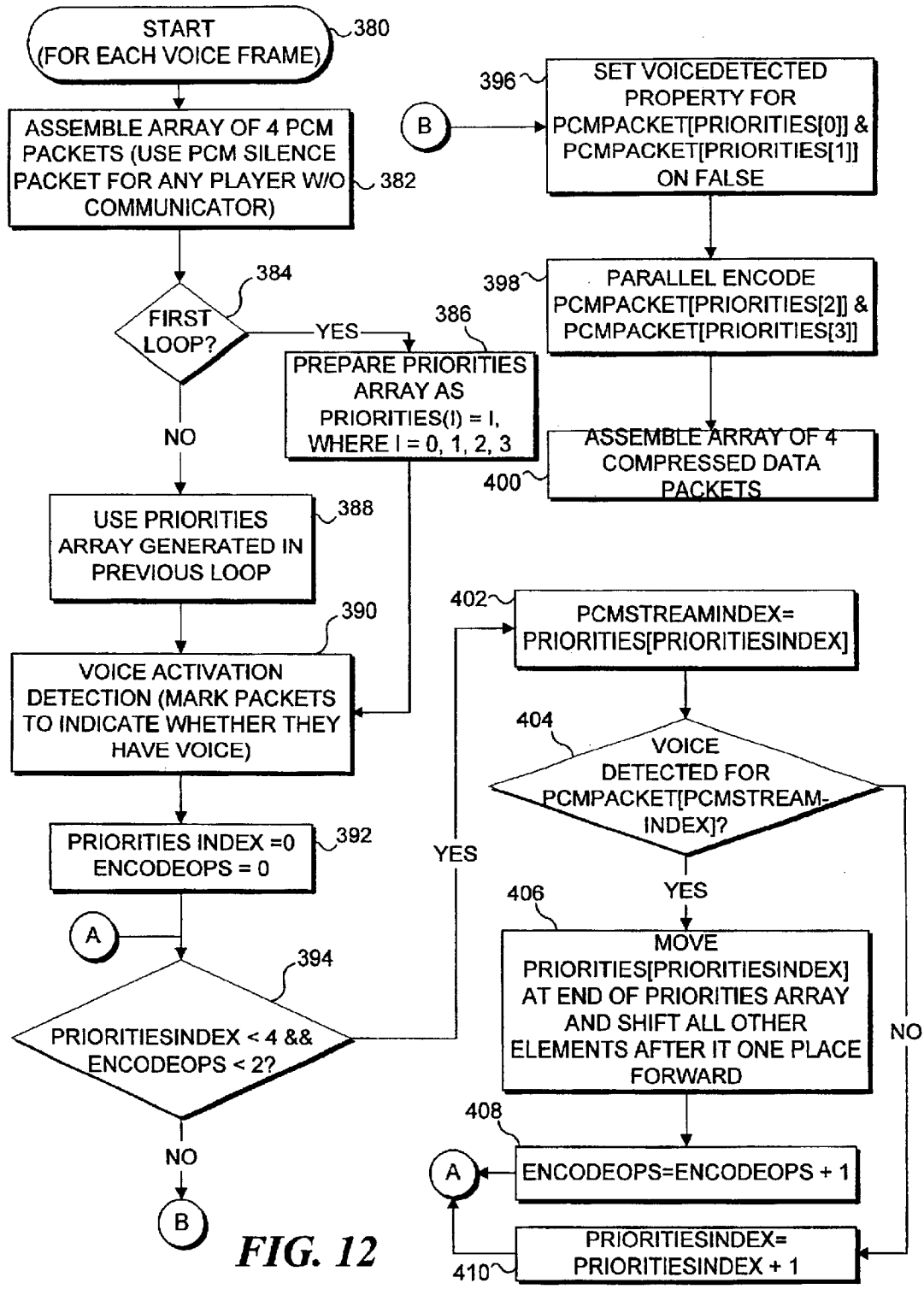
FIG. 12 is a flow chart illustrating the steps carried out for round robin encoding of sound packets.

A round-robin encoding method is used to enable two parallel encoders to encode voice communications from four players, so that fewer encoders are required on the game console than the total number of players that may be speaking during any given voice data frame. FIG. 12 provides details concerning the logical steps that are implemented to enable round-robin encoding of a voice frame, beginning with a start block 380. In a step 382, an array of the four PCM packets (one for each player) is assembled. In the case where a player does not have a voice communicator, a PCM silence packet is inserted into the array. A decision step 384 determines if the logic is carrying out a first loop for the current voice frame. If so, a step 386 provides for preparing priorities in an array using the variable priority (i) where i can have the values 0, 1, 2, or 3. Thereafter, the logic proceeds with a step 390.

If the logic is not making a first loop for the current voice frame, it proceeds to a step 388, wherein the logic uses the priorities array that was generated in a previous loop for the current voice frame. Thereafter, the logic also proceeds to step 390. In step 390, the detection of voice activation is carried out so that PCM packets are marked to indicate whether they have voice content. The algorithm detects whether the current sound level is substantially greater than an average (background) level, which indicates that a player with a microphone is probably currently speaking into it. Alternatively, the PCM packets can be analyzed to detect voice characteristics, which differ substantially from background noise characteristics. A step 392 then initializes the variable priorities index as being equal to zero and a variable encodeops as being equal to zero.

A decision step 394 determines if the priorities index variable is less than four and whether the encodeops variable is less than two. Since decision step 394 is initially reached immediately after step 392 in which these two variables have been initialized to zero, both these criteria are met, leading to a step 402. In step 402, a variable PCM stream index is set equal to the variable priorities with a value i equal to the priorities index variable. In the initial pass for a voice frame, the PCM stream index variable is set equal to priorities [0].

A decision step 404 then determines if voice has been detected for PCM packet with an index equal to the PCM stream index. Again, with the initial pass through this logic during a voice frame, the decision step determines if a voice was detected for PCM packet [PCM stream index]. If so, a step 406 moves the variable priorities [priorities index], which is at the end of the priorities array and shifts all other elements after it one place forward. A step 408 then sets the variable encodeops equal to its previous value plus one, thereby incrementing the variable. If voice was not detected in decision step 404, a step 410 sets priorities index equal to priorities index plus one, thereby incrementing that variable. Following either step 408 or step 410, the logic proceeds with decision step 394.

Once the priorities index variable is equal to four or the encodeops variable is equal to two, the logic proceeds to a step 396. In this step, the logic sets the voice detected property for PCM packets [priorities [0]] and PCM packets [priorities [1]] on false. A step 398 then provides for parallel encoding of PCM packet [priorities [2]] and PCM packet [priorities [3]]. Finally, in a step 400, the logic assembles an array of four compressed data packets for transmission over the network for the current voice frame. Based upon this logic, it will be apparent that if all four players are actually speaking, PCM packets will be encoded to form the compressed packets using this round-robin algorithm so that all of the players on a voice console can communicate with other players in the game.

It may be helpful to work through an example in which it is assumed that players one, two, three, and four are all talking at the same time. A history of the last two voices or players that have been encoded is maintained. The logic starts looking at the current microphone packet for player one. If a voice is detected by the algorithm, it is encoded. Next, the same determination is made for player two, i.e., if a voice is present at player two's microphone, it is encoded in the current voice frame. The initial history starts out with the players ordered [1, 2, 3, 4], but at this point it is updated so that the order is players [3, 4, 1, 2]. The logic loops back, after a predefined microphone encoding interval, to process the audio data for the two players that were not processed the last time. Currently the history list is [3, 4, 1, 2], so a check is made to determine if player three currently has voice input on his microphone, and if so, it is encoded. However, if player three is no longer talking at this time, the logic instead proceeds to player four, who it is assumed is talking. Accordingly, the digital PCM voice packet for player four is encoded and the history is updated to [3, 1, 2, 4]. Next, the logic proceeds to player one, encoding that player's voice, producing a new history [3, 2, 4, 1]. The logic will then start with players three and two. Assuming that player three still is not speaking so that there is no voice at that player's microphone, the logic encodes the digital PCM packets for players two and four, yielding a history list [3, 1, 2, 4].

In one embodiment, for each PCM packet of a player that is skipped and not encoded, the previous packet for that player is attenuated and replayed for the voice frame. In the worst possible state, when all players are talking and there are actually four different players on the game console who are in different teams, every other PCM packet of each player is skipped. Although this approach may have a slight negative impact on the quality of the voice of each player, it is the worst case scenario, and this scenario typically occurs infrequently during game play.

It should be noted that PCM packets of a player that are skipped and thus must be filled in by repeating the previous packet are not transmitted over the network. Instead, the repeated PCM packet is handled by the receiving game console used by the intended recipient of the packet. Accordingly, at most, two packets are sent from a game console during any one voice frame, instead of the maximum of four. The queue buffers the previous packet and provides it to replace a skipped packet. Alternatively, a skipped packet will not be put into the queue by the receiving game console, but instead, a notification indicating that the packet was skipped by the game console that made the transmission will be inserted into the network queue of the receiving game console, for that channel.

The round-robin encoding technique only operates on two frames of speech at a time and repeats the other frames of those streams that are not currently encoded. As noted above, this can result in degradation of sound when all four players on a game console are speaking, but the technique avoids using additional CPU resources to separately encode the voices of all four players, which might have a negative impact on game play.

In an alternative embodiment, one encoder per player is allocated for encoding speech. However, this embodiment is less desirable, because it requires twice the computational resources as the embodiment discussed above.

Voice Communication over Link/Network

Figure 10:
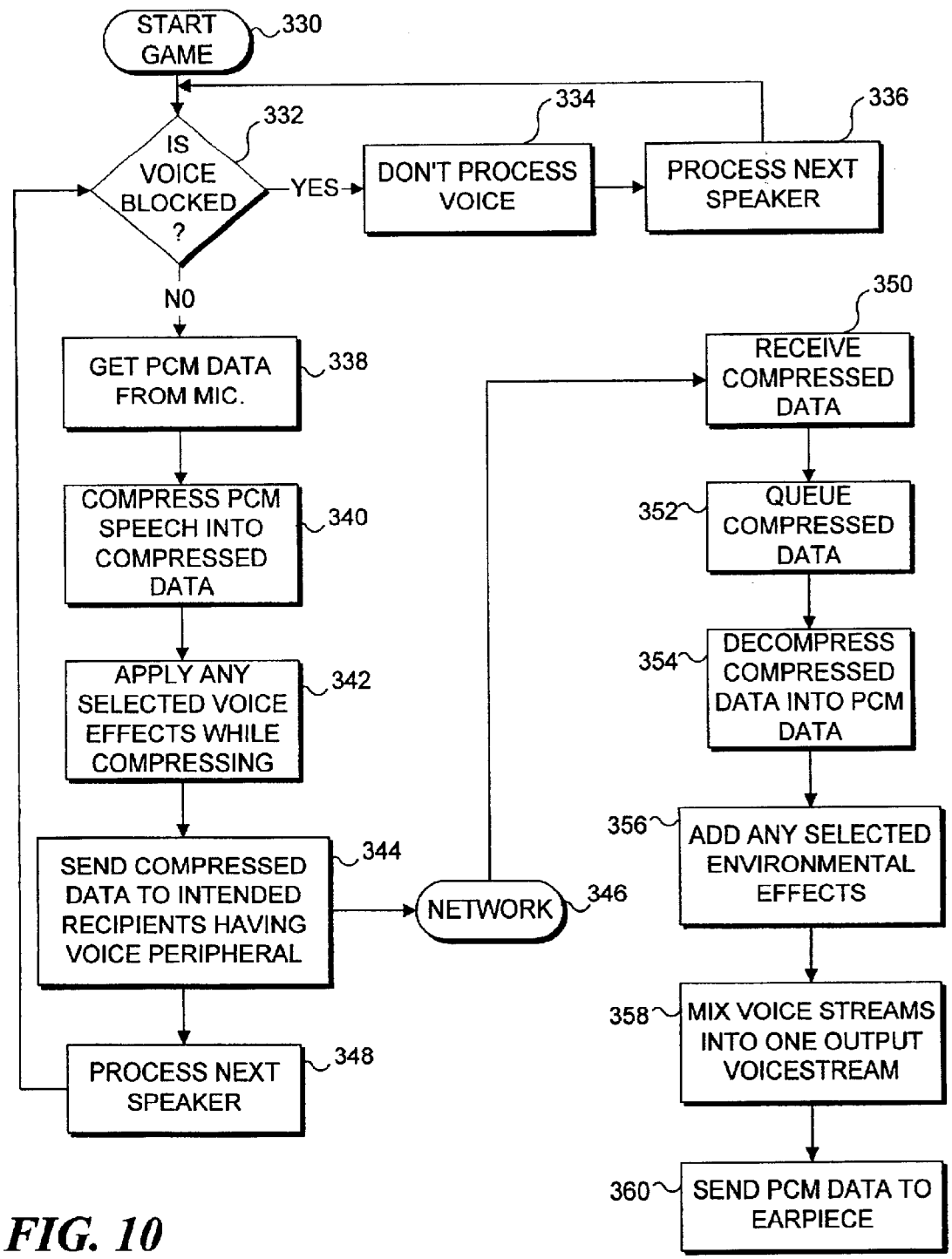
FIG. 10 is a logic diagram illustrating further details of the steps for transmitting and receiving encoded packets of sound data over a network.

FIG. 10 illustrates the general steps applied for enabling voice communications over a link or network. Initially, a game is started in a step 330. Next, a decision step 332 determines if the player is stopped from communicating by voice with other players. This state may result because of the player being banned or suspended from voice communication by the online game service due to violations of a code of conduct or other service policies. Another reason voice may be blocked is due to a determination by an authorized person such as a parent that a minor child should not be permitted to engage in voice communications with other players during a game. This option is available and can be set using options provided on the game console for specific player accounts. Once set, the data are stored on the online game service, and blockage of voice communication is enforced each time the player connects to the service. If the current player's voice communication is blocked, a step 334 determines that the game console need not process voice communications and instead, proceeds to a next speaker, in a step 336. Assuming that the next speaker is not precluded from having voice communication by a setting on the game console, the logic advances to a step 338, which gets the PCM data from the ADC in the voice communication module for that player. Next, the logic compresses the PCM speech data into compressed data in a step 340. A step 342 applies any assigned voice effects when compressing the current player's PCM speech data to alter the characteristics of the player's voice. In a step 344, the compressed data are transmitted over a network 346 to an intended receiving game console to reach the intended recipients that have a voice communication module. A step 348 provides for processing the next speaker on the game console that is transmitting compressed data, thereby returning to decision step 332.

On the game console that has received the voice communication over network 346, a step 352 provides for adding the compressed data to a network queue of such data. Next, in a step 354, the game console decompresses the compressed data pulled from the queue, producing corresponding PCM data. A step 356 provides for adding any optional environmental effects. Such effects are generally determined by options provided in a game being played on the game console. For example, an environmental effect might include adding an echo, or introducing a reverberation if the environment of the game is within a cavern, or the environmental effect might involve providing a frequency band equalization, e.g., by adding a bass boost for play of the audio data on small speakers. Next, a step 358 mixes voice streams received from a plurality of different players into one output voice stream that will be provided to an intended recipient player. The output voice stream is conveyed as PCM data to the DAC associated with the headphone of the intended recipient player in a step 360, which produces a corresponding analog signal to drive the headphone. The player thus hears the voice communication from each of the players that were decoded and mixed into the output voice steam.

Muted Voice Communication Between Players

Another situation arises whenever a specific player has been muted from voice communication by another player. Once a player has thus been muted, the specific muted player will be unable to either hear or speak with the muting player. The muting player must explicitly unmute the muted player to restore voice communication.

Handling of Network Data Packets

Figure 11:
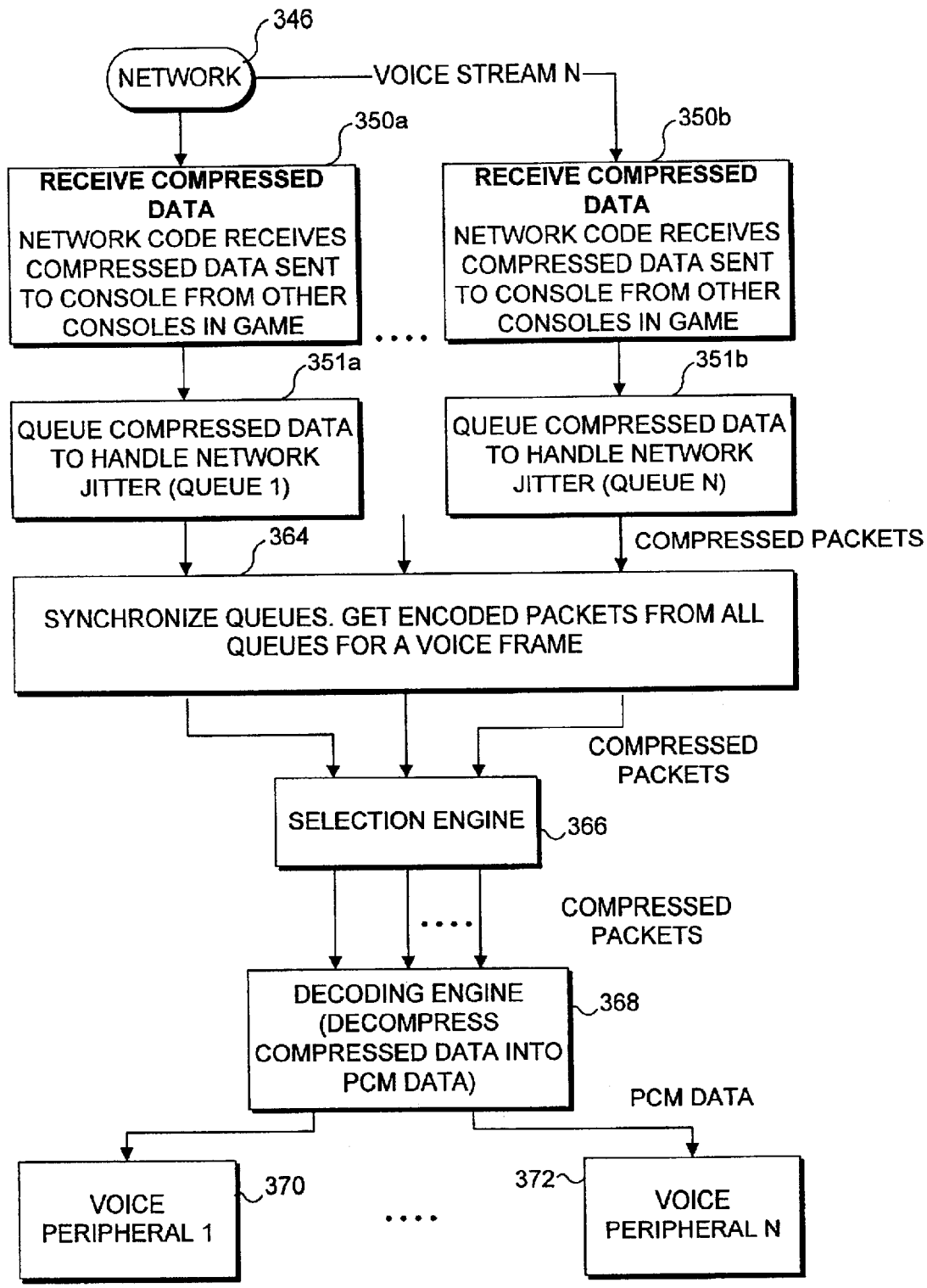
FIG. 11 is a functional block diagram showing how voice streams are received, queued, and decoded for each player on a multiplayer game console.

FIG. 11 illustrates further details in regard to the receipt of voice communication data as packets over network 346. As indicated in block 351a and 351b, compressed data are received over the network from N other game consoles. Each channel of the compressed data is initially input into one of N queues 351a–351b, where a separate queue is provided for each player on a connected game console (one or more players on each game console). A block 364 then synchronizes the N queues that have been formed to receive the compressed data. In this step, the encoded and compressed compressed packets are obtained from all of the queues for a current voice frame. A selection engine 366 then determines the compressed packets that should be assembled for input to the decoding engine in a block 368. The decoding engine decompresses and decodes the compressed data, converting the data into PCM data that are then applied to each of the connected voice peripheral communications modules 370 through 372 to enable the players respectively using those voice communication modules to hear the sound that was transmitted over the network to them.

Figure 7:
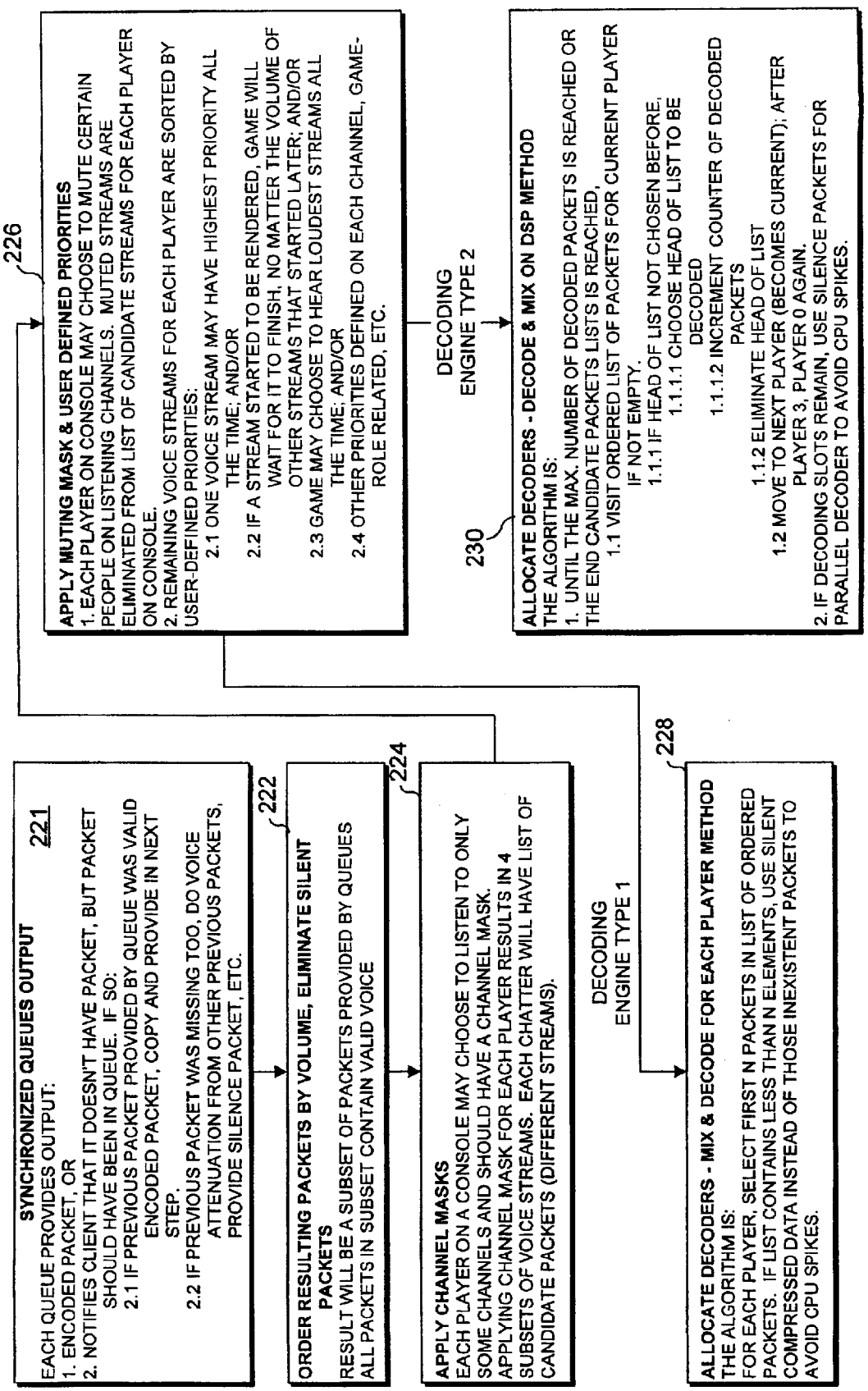
FIG. 7 is a logic diagram illustrating the steps employed by the present invention in selecting packets from a queue to decode on a multiplayer game console.

Details relating to the processing of encoded packets that are received from each queue are shown in FIG. 7. In a block 221, the CPU checks each queue to obtain an encoded compressed packet or the queue notifies the client CPU that it does not have a packet from a player, but that a packet for that player should have been in the queue. In this case, the CPU determines if the previous packet obtained for that player from the queue was in fact a valid encoded packet and if so, the CPU copies the previous packet for that player so it can be provided for further processing in the next block. However, if the previous packet for that player was also missing, the CPU does an attenuation on previous packets for that player. The purpose of this step is to minimize the perception of silence caused by a missing packet resulting from skipping packets during round-robin encoding and from dropped packets due to network conditions.

Next, in a block 222, the packets that have been obtained in block 221 are ordered, and all silent packets in the order are eliminated. The result is a subset of the packets originally provided in the queues. Due to the processing noted above, all packets in the subset will contain valid voice data.

Next, a block 224 provides for applying channel masks to the voice data. Each player is associated with a channel, and all players on a particular channel are able to communicate by voice with each other. For example, one channel may be used for voice communication between a player who is designated as a team leader and team members, enabling that player to communicate with all members of the team. In addition, the team leader may also be able to select another channel for verbal communication with another player designated as a commander, who is able to communicate with a plurality of team leaders, or yet another channel to enable the team leader to communicate only with the other team leaders. In this implementation, each player who is talking is given a 16-bit word that defines the "talker channel" for the player. The game determines what the individual bits of the word for the talker channel mean, e.g., indicating that the talker channel is for a team, a team leader, a commander, etc. In addition, each player can be assigned a "listener channel" on which they can receive speech. When a voice communication comes in over the network, the talker channel is logically "ANDed" with the listener channel for a given player, and if the result is not zero, then that player is able to hear the voice communication. In this manner, the game being played (or each player, within the constraints of the game) is able to select arbitrary permutations that determine the players that are coupled in voice communication with other players.

Referring again to FIG. 7, block 224 enables each player to choose to listen to only some channels and to employ a channel mask. A channel mask is applied for each player on the game console resulting in up to four subsets of voice streams—one subset for each player listening, based upon the player's individual listener mask. Each person who is listening will have a list of candidate packets included in different voice streams.

In a block 226, the muting mask and user defined priorities are applied. While a preferred embodiment enables a player to selectively preclude further voice communications with a selected player, it is also contemplated that a player might selectively only mute voice communications with a specific player during a current game session. In this alternative embodiment, each player on a game console might choose to mute certain people on listening channels. Voice streams from players who have been muted by that player will then be eliminated from the list of candidate voice streams for that player on the game console. Any remaining voice streams for each player are sorted by user-defined priorities. In this step, one voice stream may have the highest priority all the time. For example, the game (or a player—if the game permits this option) may selectively set a channel coupling team member in voice communication with a team leader so that that channel has the highest priority for each of the team members. Loudness of the incoming voice stream can also be a basis for determining the priority of a channel for a given player, so that the player hears the loudest voice streams all of the time. Alternatively, or in addition, if a voice stream has started to render, the game will wait for it to finish regardless of the loudness of the other voice streams that started later so that a sentence is not cut off in "mid-stream," before it is finished. As a further alternative or in addition, other priorities can be defined for each voice channel. For example, a game-specific role related priority can be applied.

Following block 226, decoding is applied to the voice streams resulting from applying the muting masks and user/game defined priorities using either a decoding engine type one as indicated in a block 228 or a decoding engine type two as indicated in a block 230. In block 228, decoding engine type one allocates decoders, mixing and decoding for each player method. In this algorithm, for each player, the first N packets in a list of ordered packets are selected. If the list contains less than N elements, silent compressed data packets used instead of the inexistent packets to avoid producing spikes in the CPU processing of the voice packets.

In block 230, when applying decoding using engine type two, decoders are allocated for decoding and mixing in a DSP method. In accordance with this algorithm, until the maximum number of decoded packets is reached, or the end of the candidate packet is reach, or the end of the candidate packet list is reached, the current player is obtained from the ordered list of packets, if the list is not empty. If the head of the list of ordered packets has not been chosen before, the head of the list is then chosen to be decoded and the counter is incremented for the decoded packets. Thereafter, the head of the list is eliminated from the ordered list. Next, the algorithm moves to the next player, who then becomes the current player. For example, after player four, player one would then again become the current player. If any decoding slots remain for decoding additional voice packets, silence packets are applied to the parallel decoder to avoid spikes in CPU processing of the voice packets.

Decoding Engines, Types One and Two

Figure 8:
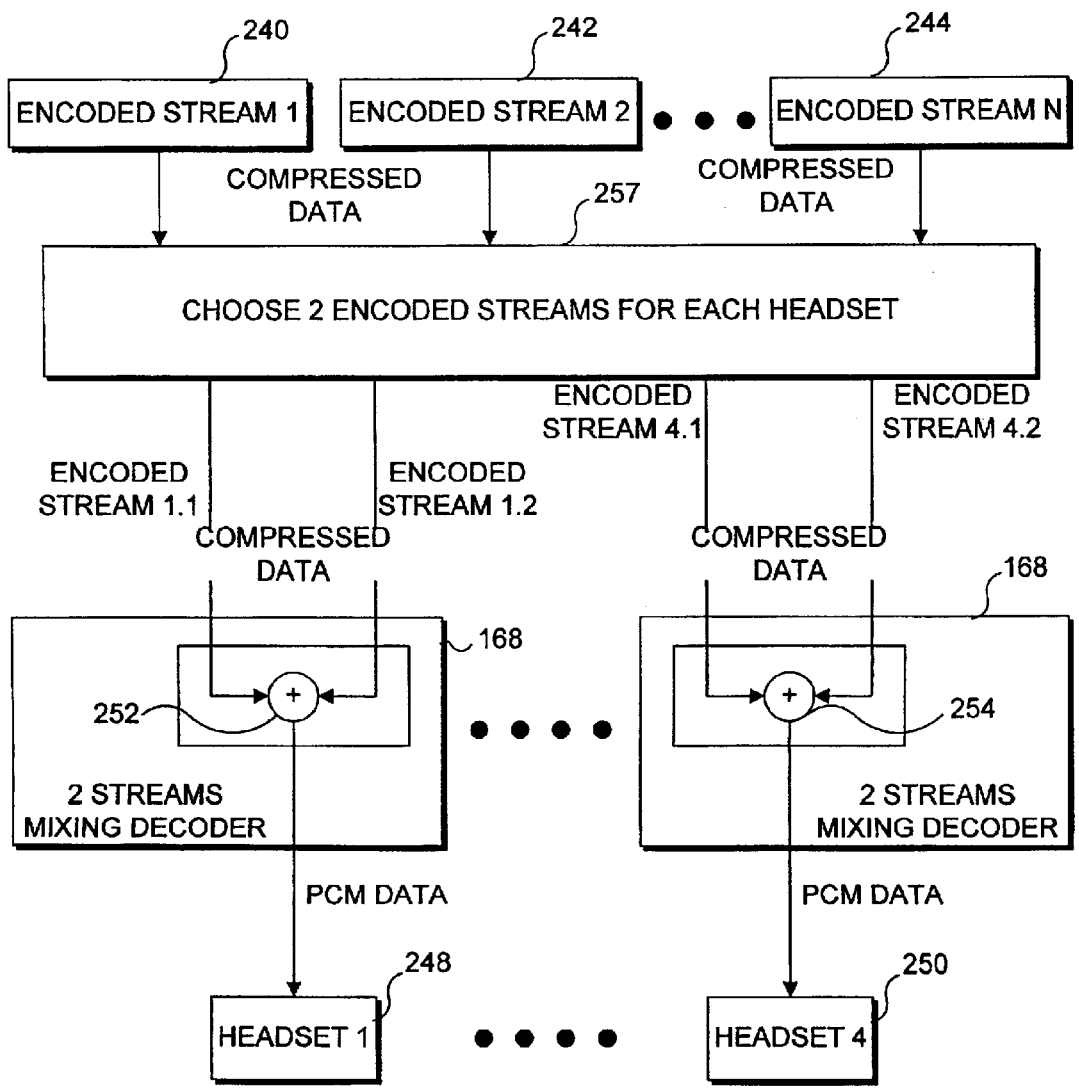
FIG. 8 is a functional block diagram illustrating a Type 1 decoding engine used in the multiplayer game console.

In FIG. 8, details relating to the functional aspects of decoding engine type one are illustrated. As shown therein, encoded streams from one through N designated by reference numerals 240, 242, and 244 provide compressed data to a selection engine 257 that chooses two encoded streams for decoding for each player headphone. In this case, an encoded stream 1.1 and an encoded stream 1.2 are selected for input to decoder 168 where the streams are mixed by a mixer 252 prior to decoding. The output of the decoder is PCM data that are supplied to the DAC within the voice communication module for a headset 248. Similarly, for each of the other player headphones, another decoder 168 receives encoded voice streams as compressed data, which are then mixed and decoded. As shown, the decoder for a fourth player includes a mixer 254 that mixes encoded voice streams 4.1 and 4.2 so that the decoder produces PCM data that are supplied to the DAC that provides the analog signal to drive a headphone 250 for the fourth player on the voice console. Of course there are instances where less than four players will be using a game console, in which case, fewer than four decoders are required to be active.

An alternative embodiment to both decoding engine type 1 and decoding engine type 2 conveys the prioritized voice streams (at block 226) directly to the DSP in the voice communication module of the intended recipient.

Figure 9A:
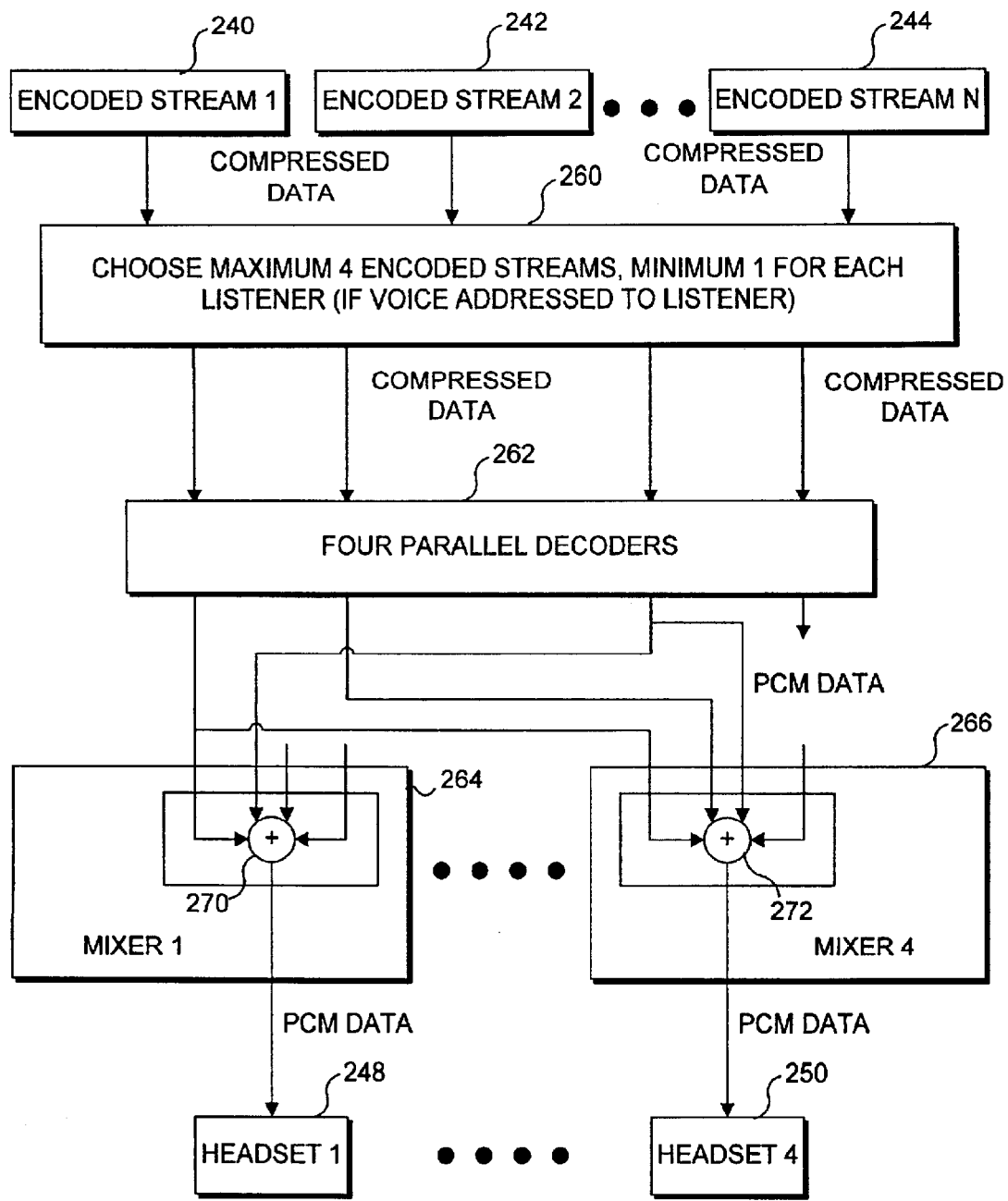
FIG. 9A is a functional block diagram illustrating a Type 2 decoding engine used in the multiplayer game console.

Functional aspects of the type two decoding engine are illustrated in FIG. 9A. Again, encoded streams one through N represented by reference numbers 240, 242, and 244 are input to a selection engine 260, which chooses the maximum four encoder streams, a minimum of one for each player who is listening and has a voice stream addressed to that player.

In this case, four parallel decoders 262 receive the four selected encoded voice streams of compressed data. The decoders then decode the compressed data and supply the resulting PCM data to a mixer for each player to whom any voice stream was intended. In this case, the first player receives two voice streams from other players that are mixed by a mixer 270 in a mixer identified by reference number 264. Although not shown, each of the other players receiving voice communications from other players in the game would also be provided with a separate mixing bin to which the output of the four parallel decoders is applied for mixing. For example, the fourth player receives three voice streams that are mixed by a mixer 272 in a mixer identified by reference numeral 266. The resulting PCM data are then applied to headset 250 for the fourth player. Thus, each player can receive from one to four voice streams that are mixed by the four-in-one mixing bin assigned to that player.

Another embodiment (at block 260) bypasses decoder 262 and mixers 264 and 266 and conveys the compressed data to the DSPs of the voice communication modules coupled to headphones 248 and 250, respectively.

Figure 9B:
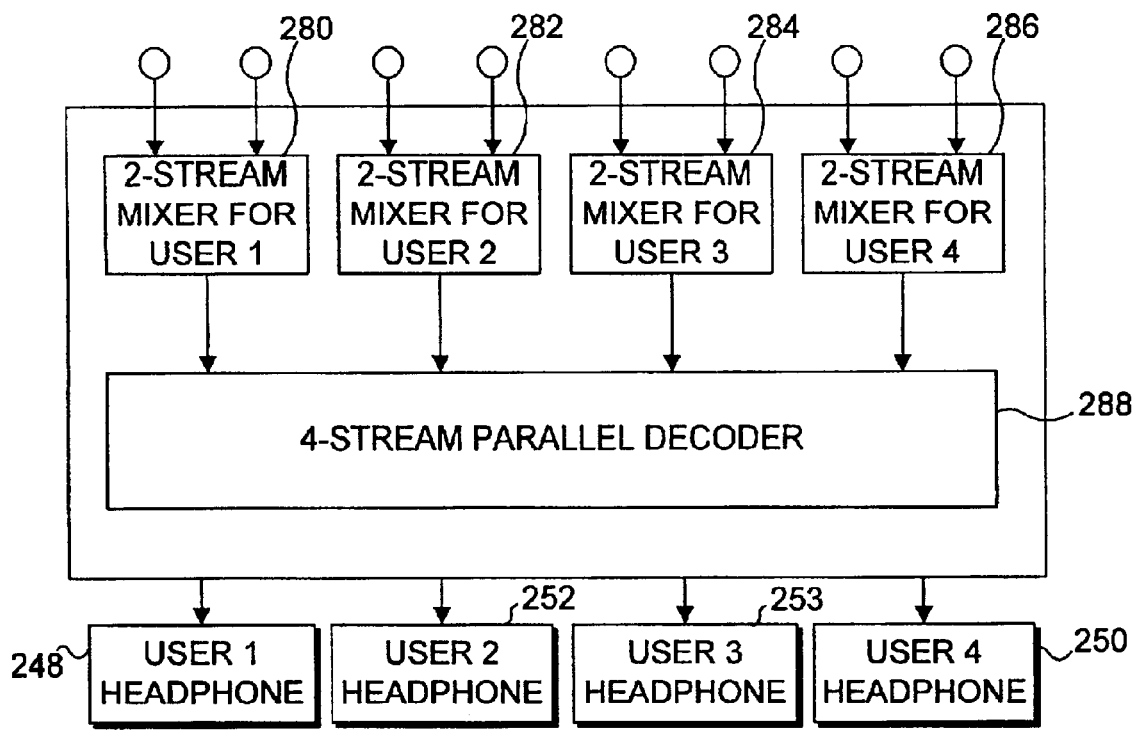
FIG. 9B is a block diagram illustrating details of the mixers and 4-stream parallel decoder of FIG. 9A.

An alternative approach for use in the type two decoding engine is illustrated in FIG. 9B. In this embodiment, the relative disposition of the decoder and the mixers are reversed from that shown in FIG. 9A. Specifically, each player is provided with a two-stream mixer that is coupled to receive and mix the compressed data incoming over the network. A two-stream mixer 280 is provided for player one, a two-stream mixer 282 for player two, a two-stream mixer 284 for player three, and a two-stream mixer 286 is provided for player four. Up to two voice streams of compressed data are thus input to each of these mixers per player and are mixed, providing a single mixed stream from each mixer for input to a four-stream parallel decoder 288. This decoder then decodes the compressed data producing PCM data that is supplied to each player headphone 248, 252, 253, and 250 who is an intended recipient of a voice communication from another player.

Yet another embodiment provides that the compressed data conveyed to two-steam mixers 28, 282, 284, and 286 is decoded by the DSPs of the voice communication modules coupled respectively to headphones 248, 252, 253, and 250.

Controlling Voice Communication with Other Players

Figure 13:
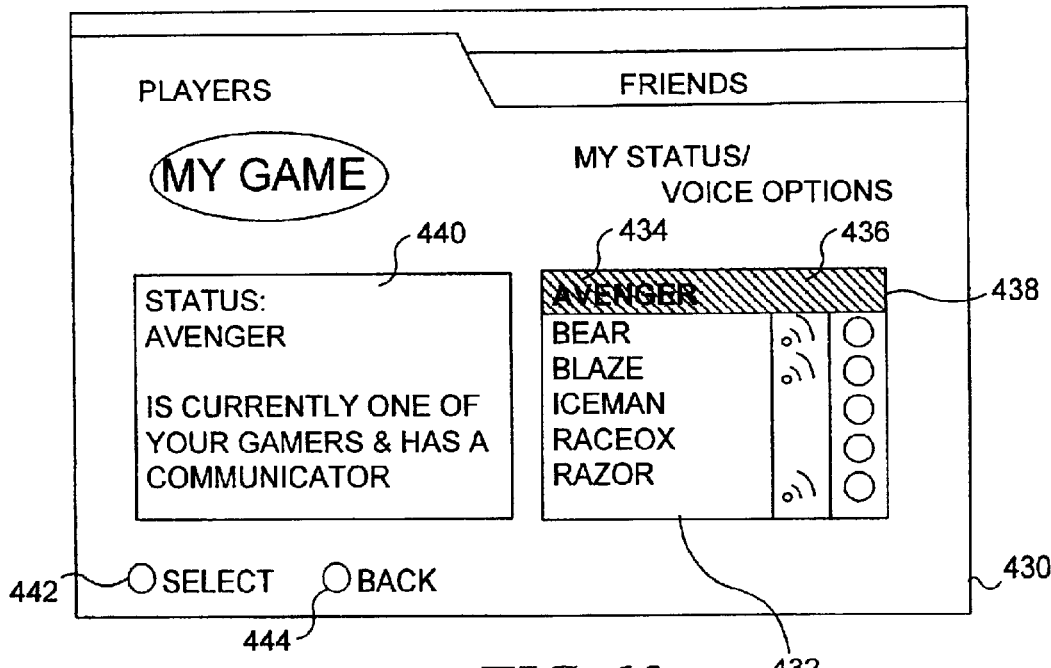
FIG. 13 is an exemplary user interface for selecting voice options in a game that employs voice communication between players.
Figure 13A:
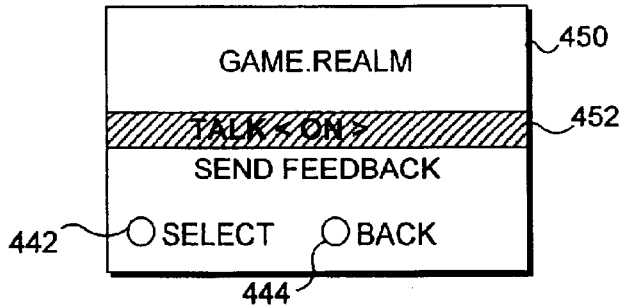
FIGS. 13A and 13B illustrate two different options that are selectable by a player to control or preclude voice communication with another player in a multiplayer game, in accord with the present invention.
Figure 13B:
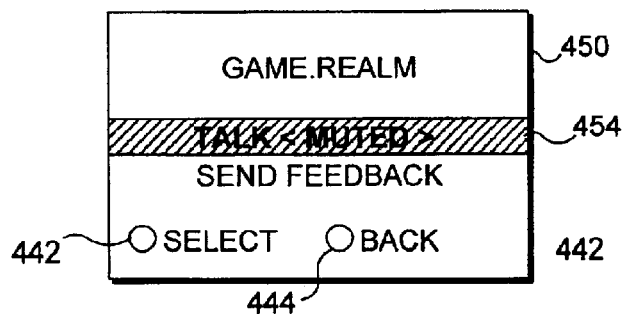

As noted above, a player has the option of precluding further voice communications with a specific player because of behavioral issues or for other reasons. For example, if a specific other player tends to uses excessive profanity, a player may choose not to engage in further communications with that other player. Each game will generally provide an option for a player to mute voice communications with another player for the current and future game sessions, and it is also contemplated that a player might also be enabled to mute voice communications with another player for only a current game session. FIGS. 13, 13A, and 13B illustrate exemplary dialog boxes that enable this control of voice communication to be implemented in a game called "MY GAME." This fictitious game lists each of the players, as shown in a player list box 430. Player list box 430 includes six players of which the top listed player has been selected as indicated by a selection bar 434. This player, who plays the game using the alias "Avenger," has voice communications capability, as indicated by a speaker symbol 436 that is shown in one column of the dialog, in the same row as the alias. Players respectively using the aliases "Iceman" and "Raceox" do not have voice communication capability, as is evident by the lack of speaker symbol 436 in this column, in the same row as either of these aliases. A radio button 438 is provided to enable any of the players listed to be muted from voice communication with the current player who is viewing players list box 430. In this case, Avenger has been selected by the player, as indicated by radio button 438. When the player is selected, a window 440 opens that identifies the selected player and notes that this player is currently one of the participants in the game and has a voice communication module. If the player viewing player's list box 430 clicks on a select button 442, a voice communication status select 450 opens that includes an option bar 452, which can be toggled to different states. As shown in FIG. 13A, option bar 452 indicates that the selected player has been enabled to verbally communicate with the player who is selecting this option. In FIG. 13B, the option bar has been toggled to a state 454, which indicates that the player viewing the state wants to mute the selected player for the current game session. Depending upon the selection that the player makes, speaker symbol 436 will change. Instead of that shown in FIG. 13, if the player selected the option to mute the specific player has been chosen a dash box will appear around the speaker symbol shown. This type of muting expires after the current game session ends. On the other hand if the specific player has been selectively locked out, a dash heavy-bar box will be added around speaker symbol 436. In this case, the decision to mute a player can only be turned off by the player making that decision from within a game session or using a system control for the game console. Yet another symbol (not shown) is used to indicate that voice communications for corresponding player are being played through loudspeakers (e.g., television or monitor speaker) connected to the game console of the recipient player, rather than through a headphone. This option can be selected by a player, who prefers not to wear a headset, but is less desirable, since the player will not be using a microphone to verbally communicate with other players.

In the event that a number of players provide negative feedback concerning a specific player based upon the verbal behavior of that player being deemed to be unacceptable, such as excessive use of profanity, or use of sexually explicit language, the online game service can automatically determine that the number of complaints received has exceeded a threshold, causing the specific player to be banned from further voice communication. The ban might initially be for a limited period of time such as a week, and then subsequently, if further complaints are received beyond the threshold, the specific player might be banned permanently from voice communication. A specific player that has been banned in this manner will be informed first of the temporary suspension of voice communication capability, and then of the permanent suspension, if the behavior of the player causes that result. Each time a player logs into the online game service on a game console, permission flags are downloaded to the game console as part of the sign in process. These flags include information about various aspects of the system. One of the flags determines whether a specific player has permission to engage in voice chat. Accordingly, in the event that a specific player violates the terms of service or code of conduct, the bit controlling the ability of the player to communicate by voice can be changed to preclude such voice communications.

Once a player has elected to preclude voice communications with a specific player, the identification of the specific player is preferably transmitted to an online game service and stored there in relation to the identity of the player making that election, so that in future sessions of any games, the player who has made such a decision will not receive any voice communication from the specific other player and will not transmit any voice communication to the specific other player. This decision will not be apparent to the specific other player, since the dialog box showing the status of players in a game will simply display an indication on the specific other player's view that the player making that decision lacks voice communication capability, and in the dialog displayed to the player making the decision, the muted status of the specific other player will be indicated. Thus, even though the specific player changes the alias used or signs on with a different game console, the prohibition against voice communication for the specific player made by a player will continue in force.

It is also contemplated that the PCM data will also include lip position information associated with each segment of speech. The lip-sync information will be generated and transmitted to the encoder with the PCM data, converted to compressed data, and transmitted to recipient player so that when a player is speaking, the character represented and controlled by that player in the game appears to be speaking in synchronization with the words spoken by the player. Depending upon the nature of the graphics character representing the player who is speaking, the nature of the "mouth" may differ from that of a normal oral portion of a human's anatomy. For example, a character in a game might be an alien that has mandibles that move when the character speaks. Nevertheless, the synchronization of the oral portion of the character with the word spoken adds to the realism in game play. Details for accomplishing lip-sync using graphic characters and spoken words are disclosed in a commonly assigned U.S. Pat. No. 6,067,095 the disclosure and drawings of which are hereby specifically incorporated herein by reference. Alternatively, lip synchronization information can be extracted from the compressed data during decoding.

One of the advantages of the present invention is that it combines voice streams for all of the players on a game console into a single compressed data stream to more efficiently transmit data over a network within a limited bandwidth. Thus, when players on the same game console are talking to all of the other players participating in a game, all of the voice data for the players on the same console are combined into one network stream. It is not necessary to send multiple voice data streams from the game console.

Another advantage of the present invention is its ability to allocate a maximum number of encoders that is half of the number of players that might be playing a game on a game console. Accordingly, the game designer can determine the amount of resources to be allocated to voice communications and can limit those resources by, for example, providing only two encoders and requiring that the encoders operate in round-robin as discussed above. Although there is a slight negative effect from using previously transmitted packets when carrying out the round-robin approach, the adverse effect on the quality of voice communication is greatly outweighed by the limitation on the use of computing resources for voice communications to minimize adverse effects on the quality of game play.

When participating in a game over the Internet or other network, a player may optionally, depending upon the game being played, choose to play only with players who agree to a specific language in which voice communications are to be conducted. Also, the player can optionally determine that the game will only be played with those players having voice communication capability. Similarly, players without voice communication capability may selectively engage join in games only with those other players who also do not have voice communication capability.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

What is claimed is:

1. For use with an electronic game played on at least one multiplayer game console, a method for enabling players to verbally communicate in real-time while playing the game, comprising the steps of:
    (a) providing an audio sensor for at least one player who is using the multiplayer game console, said audio sensor producing an input signal to the game console in response to sound produced by said at least one player;
    (b) providing at least one sound transducer that is adapted to produce sound audible to another player of the game in response to an output signal;
    (c) encoding the input signal from the audio sensor to produce an encoded digital signal;
    (d) conveying the encoded digital signal through a voice channel associated with said other player;
    (e) decoding the encoded signal in the channel of the other player, to produce the output signal; and
    (f) providing the output signal to the sound transducer to produce an audible sound corresponding to the sound produced by said one player, so that a verbal communication by said one player is heard by said other player of the game.

2. The method of claim 1, further comprising the steps of:
    (a) providing another audio sensor to detect sound produced by said other player, producing another input signal in response the sound produced by said other player;
    (b) providing a sound transducer for said one player, adapted to produce sound audible by said one player of the game in response to another output signal;
    (c) encoding the other input signal from the other audio sensor, producing another encoded digital signal;
    (d) conveying the other encoded digital signal through a channel associated with said one player;
    (e) decoding the other encoded signal in the channel associated with said one player, to produce the other output signal; and
    (f) providing the other output signal to the other sound transducer to produce an audible sound corresponding to the sound produced by said other player, so that a verbal communication by said other player is heard by said one player of the game.

3. The method of claim 1, wherein said one player and said other player are playing the electronic game on different multiplayer game consoles that are coupled in communication, so that the encoded signal is conveyed between the multiplayer game consoles of said one player and said other player.

4. The method of claim 1, further comprising the step of enabling said one player to select said other player with whom said one player will verbally communicate.

5. The method of claim 1, wherein said one player and said other player are members of a team, further comprising the steps of repeating steps (a)–(f) for players on another team, to enable the players on the other team to verbally communicate with each other.

6. The method of claim 1, further comprising the step of repeating steps (a)–(f) for additional players who are playing the electronic game using the multiplayer game console, to enable said additional players to verbally communicate with other selected players in the game.

7. The method of claim 1, further comprising the step of predefining a limit on processing resources that are allocated on the electronic game console for enabling verbal communication between the players of the electronic game.

8. The method of claim 1, further comprising the step of applying an audible effect to the encoded signal, said audible effect substantially altering characteristics of the audible sound produced by the sound transducer so that the audible sound differs from the sound produced by said one player.

9. The method of claim 8, wherein the step of applying the audible effect substantially removes personal identifying characteristics of the sound produced by said one player so that a voice of said one player is substantially indistinguishable from a voice of another player.

10. The method of claim 8, wherein the audible effect changes a tonal range of the audible sound from that of the sound produced by said one player.

11. The method of claim 8, wherein the audible effect corresponds to change in a gender associated with the sound produced by said one player.

12. The method of claim 1, further comprising the step of applying an audible effect to the output signal so that the audible sound differs from the sound produced by said one player.

13. The method of claim 12, wherein the audible effect is one of a frequency band equalization, a reverberation, and an echo.

14. A memory medium having a plurality of machine instructions for carrying out the steps of claim 1.

15. A method for enabling a plurality of players on a game console to verbally communicate through the game console during play of a game, comprising the steps of:
  (a) for each of the plurality of players who are participating in the game, providing an audio sensor and an audio transducer coupled to the game console for use by the player, said audio sensor producing an input signal to the game console in response to a verbal utterance produced by the player, said audio transducer producing sound audible to the player in response to an output signal from the game console;
  (b) encoding the input signal from each audio sensor into a format used by the game console for transfer to at least one intended recipient from among the plurality of players;
  (c) for each intended recipient, decoding from the format used by the game console, to produce the output signal for the intended recipient; and
  (d) for each intended recipient, producing an audible signal corresponding to the output signal, using the audio transducer of the intended recipient so that the intended recipient hears a verbal communication from another player of the game.

16. The method of claim 15, further comprising the step of predefining a level of computing resources allocated to processing verbal communication on the game console, said level being fixed and independent of changes in a number of players using voice communication while playing the game.

17. The method of claim 15, further comprising the step of communicating data in said format over one of a direct link and a network to said at least one intended recipient, wherein said at least one intended recipient is using another game console to play the game and to process the data in said format.

18. The method of claim 15, further comprising the step of enabling each player to select the intended recipient of a verbal communication of the player, said intended recipient being selected from among the plurality of players of the game in accord with any constraints imposed by the game.

19. The method of claim 15, wherein the step of encoding comprises the steps of:
  (a) converting the input signal from an analog signal to a digital signal; and
  (b) compressing the digital signal to produce a compressed digital signal having said format.

20. The method of claim 19, wherein the step of decoding comprises the steps of:
  (a) decompressing the compressed digital signal that has said format to produce a decompressed digital signal; and
  (b) converting the decompressed digital signal to the output signal that drives the audio transducer.

21. The method of claim 15, wherein the format comprises a plurality of data packets, each data packet extending over at least one audio time frame.

22. The method of claim 21, wherein a predefined number of encoding instances are operative on the game console during each audio time frame, and said predefined number is less than a total number of players on the game console who are producing verbal utterances.

23. The method of claim 21, wherein the step of encoding comprises the step of encoding input signals for a plurality players in parallel on a single encoding instance on the game console during an audio time frame.

24. The method of claim 22, wherein the verbal utterances of players on the game console are encoded so that if more players on the game console than the predefined number of encoding instances are speaking in successive audio time frames, a round robin selection is applied in choosing the verbal utterances that are encoded in the successive audio time frames.

25. The method of claim 22, further comprising the step of enabling a game to determine the predefined number of encoding instances active at one time.

26. The method of claim 21, further comprising one of the steps:
  (a) mixing streams of data packets from different multiplayer game consoles before the step of decoding; and
  (b) decoding streams of data packets from different multiplayer game consoles and then mixing decoded digital signals to produce the output signal for each different intended recipient.

27. The method of claim 26, wherein the step of decoding streams comprising the step of decoding the streams in parallel.

28. The method of claim 15, further comprising the steps of:
  (a) assigning selected players to a channel; and
  (b) enabling players assigned to a common channel to selectively verbally communicate with each other.

29. The method of claim 15, further comprising the steps of:
  (a) assigning each player a listener channel on which the player can receive a verbal communication from at least one other player;
  (b) assigning each player making a verbal utterance to a talker channel over which the verbal utterance is conveyed to another player;
  (c) determining whether verbal utterances that are heard by a specific player by logically combining the listener channel of the specific player with the talker channel of the player making the verbal utterance; and (d) enabling the specific player to hear the verbal utterances as a function of a result of the step of logically combining.

30. The method of claim 15, further comprising the steps of:

(a) producing oral synchronization data for controlling an oral portion of an animated graphic character in the game controlled by a player who is producing a verbal utterance; and (b) using the oral synchronization data to control the oral portion of the animated graphic character to move in synchronization with the verbal utterance of the player who corresponds to the animated graphic character.

31. A memory medium having machine executable instructions for carrying out the steps (b)–(d) of claim 15.

32. A system that enables verbal communication between players who are playing a game, comprising:

(a) a multiplayer game console that includes a processor and a memory in which are stored machine instructions for causing the processor to carry out a plurality of functions, said functions including executing an instance of a game;

(b) verbal communication input and output devices for each player who will be verbally communicating during a game, each verbal communication input and output device comprising:

(i) a sound sensor that produces an input signal indicative of sound incident on the sound sensor; and (ii) a sound transducer that produces an audible sound in response to an output signal that is applied to the sound transducer;

(c) an encoder that encodes the input signal applied to the encoder from a sound transducer, producing an encoded signal; and (d) a decoder that decodes the encoded signal, producing the output signal that is applied to at least one sound transducer.

33. The system of claim 32, further comprising an interface that is adapted to couple the multiplayer game console in communication with at least one other multiplayer game console and to convey a stream of encoded data between the multiplayer game console and the other multiplayer game console, to enable verbal communication between at least one player playing the game on the multiplayer game console and at least one other player playing the game on the other multiplayer game console.

34. The system of claim 33, wherein the processor and the interface cooperate to produce and receive packets comprising the stream of encoded data over one of a direct link and a network.

35. The system of claim 32, wherein the machine instructions cause the processor to implement the functions of the encoder and of the decoder.

36. The system of claim 32, wherein the machine instructions cause the processor to maintain a queue of encoded data received, for serial input to the decoder.

37. The system of claim 32, wherein the machine instructions cause the processor to enable a player to select and apply a sound modifying effect to substantially change the input signal so that the audible sound that is produced by the sound transducer of another player who is a recipient of a verbal communication is altered in a defined manner from the sound that was incident on the sound sensor of said player.

38. The system of claim 32, wherein the encoded signal comprises a plurality of time frames and wherein each encoder processes input signals for successive time frames, using a round robin technique, where there are fewer encoders than player producing sound to be encoded on the multiplayer game console.

39. The system of claim 32, wherein the encoded data comprises compressed data and wherein each decoder processes data streams comprising the encoded data in parallel, where each data stream is received from a different player.

40. The system of claim 32, wherein the encoder encodes input signals applied to the encoder in parallel from a plurality of sound transducers.

41. The system of claim 40, further comprising one of:

(a) a mixer that mixes data streams to produced a mixed data stream that is supplied to the decoder; and (b) a mixer that mixes decoded data received from the decoder.

42. The system of claim 32, wherein the machine instructions cause the processor to associate players with different voice channels and enable a player to select a voice channel from among the different voice channels over which to verbally communicate with players that are associated with the voice channel that is selected.

43. The system of claim 32, wherein the machine instructions cause the processor to:

(a) associate a talker channel with each player and a listener channel on which the player can receive a verbal communication; and (b) when a verbal communication is received over any talker channel, the listener channel of a player is logically combined with the talker channel to determine if the verbal communication will be heard by the player.

* * * * *